United States Patent
Plowman et al.

(10) Patent No.: US 8,698,828 B2
(45) Date of Patent: Apr. 15, 2014

(54) GRAPHICS PROCESSING SYSTEMS

(75) Inventors: Edward Plowman, Bedfordshire (GB); Jørn Nystad, Trondheim (NO); Borgar Ljosland, Trondheim (NO)

(73) Assignee: ARM Limited, Cambridge (GB)

( * ) Notice: Subject to any disclaimer, the term of this patent is extended or adjusted under 35 U.S.C. 154(b) by 248 days.

(21) Appl. No.: 12/477,490

(22) Filed: Jun. 3, 2009

(65) Prior Publication Data

US 2010/0026682 A1    Feb. 4, 2010

(30) Foreign Application Priority Data

Jun. 4, 2008   (GB) .................................. 0810205.5

(51) Int. Cl.
*G09G 5/00*      (2006.01)
*G06T 11/40*    (2006.01)

(52) U.S. Cl.
USPC .......................................... 345/582; 345/552

(58) Field of Classification Search
USPC ................................................ 345/582, 552
See application file for complete search history.

(56) References Cited

U.S. PATENT DOCUMENTS

| | | | | |
|---|---|---|---|---|
| 7,382,377 B1 * | 6/2008 | Everitt et al. | ................. | 345/582 |
| 2008/0114942 A1 | 5/2008 | Brown et al. | | |
| 2009/0066714 A1 * | 3/2009 | Liao et al. | ..................... | 345/582 |

FOREIGN PATENT DOCUMENTS

| | | |
|---|---|---|
| CN | 101178806 A | 5/2008 |
| JP | 2003/016438 | 1/2003 |
| JP | 2003 016438 | 1/2003 |
| JP | 2007-233730 | 9/2007 |
| JP | 2008-123497 | 5/2008 |

OTHER PUBLICATIONS

International Search Report dated Feb. 6, 2009 in corresponding Great Britain Application GB0810205.5.
Great Britain Search Report mailed Feb. 6, 2009 in corresponding Great Britain Application No. GB 0810205.5.
Official communication dated Feb. 9, 2009 in corresponding Great Britain Application No. GB 0810205.5.
English Translation of Chinese official action, Jul. 26, 2012, in Chinese Application No. 200910163931.2.
English Translation of Chinese Official Action dated Mar. 20, 2013 in Chinese Application No. 200910163931.2.
English Translation of Japanese Examination Report mailed Aug. 20, 2013 in Japanese Application No. 2009-134193.
Decision of Rejection issued in Chinese application No. 200910163931.2, dated Sep. 13, 2013 (with English Translation).

* cited by examiner

*Primary Examiner* — Jacinta M Crawford
(74) *Attorney, Agent, or Firm* — Nixon & Vanderhye P.C.

(57) ABSTRACT

In a graphics processing system, when a fragment reaches a texturing stage, it is determined whether the texture to be applied is a static or dynamic texture. If it is determined that the required texels relate to a dynamic texture, then the system first tries to fetch those texels from a dynamic texture memory. If it is found that the texels are not available in the dynamic texture memory, then the relevant texels are generated in an "on-demand" fashion and stored in the dynamic texture memory so that they can be applied to the fragment.

20 Claims, 4 Drawing Sheets

GRAPHICS PROCESSING SYSTEMS

This application claims priority to UK Patent Application No. 0810205.5, filed 4 Jun. 2008, the entire contents of which is hereby incorporated by reference.

The present invention relates to the processing of graphics, and in particular to the processing of 3-dimensional (3D) graphics, for, e.g., display on a display screen.

As is known in the art, 3D graphics processing is normally carried out by first splitting the scene to be displayed into a number of similar basic components (so-called "primitives") to allow the 3D graphics processing operations to be more easily carried out. These "primitives" are usually in the form of simple polygons, such as triangles.

The primitives for a scene to be displayed are usually generated by the applications program interface for the graphics processing system, using the graphics drawing instructions (requests) received from the application (e.g. game) that requires the display of the graphics.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) for display.

Once primitives for a scene and their vertices have been generated and defined, they can be processed by the graphics processing system, in order to display the scene.

This process basically involves determining which sampling points of an array of sampling points covering the scene to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the scene to be displayed). This is typically done using the positions of the vertices of a primitive.

The rendering process then derives the data, such as red, green and blue (RGB) colour values and an "Alpha" (transparency) value, necessary to display the primitive at the sample points (i.e. "shades" each sample point). This can involve, as is known in the art, applying textures, blending sample point data values, etc.

(In 3D graphics literature, the term "rasterisation" is sometimes used to mean both primitive conversion to sample positions and rendering. However, herein "rasterisation" will be used to refer to converting primitive data to sampling point addresses only.)

These processes are typically carried out by "representing" the sampling points as discrete graphical entities usually referred to as "fragments" on which the graphics processing operations (such as rendering) are carried out. Each such fragment will correspond to a given sampling point or set of sampling points and, in effect, represent and be used to render a primitive at the sampling point or points in question (the sampling point(s) which the fragment is being used to render).

A "fragment" is therefore effectively (has associated with it) a set of primitive data as interpolated to a given screen space sample point (or points) of a primitive. It may also include per-primitive and other state data that is required to shade the primitive at the sample point(s) (fragment position) in question. Each graphics fragment can reasonably be thought of as being effectively equivalent to a "pixel" of the scene as it is processed.

Indeed, each graphics "fragment" may correspond to a single pixel (picture element) in the final display (since as the pixels are the singularities in the final display, there may be a one-to-one mapping between the "fragments" the graphics processor operates on (renders) and the pixels of the display). However, it can be the case that there is not a one-to-one correspondence between a fragment and a display pixel, for example where particular forms of post-processing, such as down-scaling, are carried out on the rendered image prior to displaying the final image.

As is known in the art, the rasterising and rendering processes typically involve the graphics processor's processing units, such as fragment shaders and texture mappers, etc., fetching data from memory to use, e.g., when processing a given fragment, and then using that data to, e.g., "render" the fragment (e.g. applying that data to the fragment).

In one known technique for graphics processing, which is commonly referred to as "immediate mode" graphics processing or rendering, the vertices are processed (rasterised and rendered) as they are generated, one after another.

In this type of system, the vertices are passed to the graphics system on a first-come, first-served basis (although the vertices will normally be sorted in some manner to try to improve the efficiency of the graphics processing), and primitives are thus rendered for display in the order that they are received.

It is also known in graphics processing systems to use so-called "tile-based" or "deferred" rendering. In tile-based rendering, rather than the entire scene effectively being processed in one go as in immediate mode rendering, the scene to be displayed is divided into a plurality of smaller sub-regions, usually referred to as "tiles". Each tile (sub-region) is rendered separately (typically one-after-another), and the rendered sub-regions (tiles) are then recombined to provide the complete scene for display. In such arrangements, the scene is typically divided into regularly-sized and shaped sub-regions (tiles) (which are usually, e.g., squares or rectangles), but this is not essential.

As is known in the art, many processes that are carried out when processing graphics data for display require or include the fetching of other graphics data from memory (i.e. use previously prepared and stored data). For example, texture mapping processes may require the use of stored texture maps, rasterising processes in tile-based rendering systems may require the use of previously stored tile-lists to identify primitives to be rasterised for a tile, primitive tiling (binning) processes may use stored transformed vertex data to test against the tile positions, and so on. In each of these cases, a relevant graphic process, such as texture mapping, will identify the need for data to carry out the process and then fetch that data from memory (which may be a cache memory or other memory, as is known in the art) and then use the fetched data when performing its process.

In order to facilitate these operations, graphics processing systems are normally configured to ensure that all the data that may need to be fetched by graphics processes in this manner as a scene is processed for display is stored in memory and available for the graphics processes to use, before the relevant processes are begun. This is so as to ensure that the relevant data is available when a graphics process seeks it from memory as it processes the scene for display. (A scene will typically be made up of one or more, and usually a plurality, of draw calls (i.e. groups of primitive(s) to be drawn), as is known in the art.)

This applies both to so-called "static" graphics data (i.e. data that may be predefined, e.g., for plural scenes in common, such as "static" texture maps) and so-called "dynamic" graphics data (i.e. graphics data that is generated on a scene-by-scene basis (in effect, as part of a scene, rather than in advance for plural scenes). Such "dynamic" data may be required, e.g., because the data cannot be predefined or generated in advance of the scene for which it is required, e.g., because it is based on, and/or required in response to, a user input, and/or will vary on a scene-by-scene basis, and/or depends on an intervening dynamic stage and so cannot be predicted in advance.

Examples of "dynamic" graphics data include so-called "dynamic textures" ("dynamic texture maps") and tile-lists for a scene (in tile-based rendering systems). Such data may, for example, relate to analysis and/or viewing of the scene from different angles (e.g. not from the actual viewpoint angle), so as to provide data, such as a shadow map, for processing the scene.

"Static" graphics data may, e.g., be provided by the application that requires the graphics processing and stored in memory for use as scenes are to be rendered.

For "dynamic" graphics data, the host system and/or the graphics processing system is usually controlled to generate and store that data before the scene is processed for display, so that again that data will be available in memory in advance of the scene itself being processed for display.

FIG. 3 shows an exemplary "dynamic" graphics data generation process.

FIG. 3 shows schematically a scene 50 to be rendered, which is being viewed from a viewpoint 51. However, the scene is also to be illuminated by two light sources 52, 53.

As is known in the art, in order to apply the effects of the light sources 52, 53 on the scene when it is displayed, so-called "shadow maps" (which are a form of texture map) in respect of each light source will be applied to the rendered image. Such "shadow maps" are an example of dynamic graphics data, since they may be generated on a scene-by-scene basis.

In order to generate a shadow map dynamically, the scene will typically be rendered as if viewed from the position of the light source to which the shadow map corresponds, so as to generate a texture map that can then be applied to the scene to in effect represent the effect of the shadows cast by the light source when viewed from the viewpoint for the scene.

Thus in the case of the scene shown in FIG. 3, the graphics processor will first be controlled to render the scene (via an appropriate drawing call) in relation to the light source 53, so as to dynamically generate a shadow map 54 representing the effect of that light source on the scene. Then the graphics processor will similarly be controlled to render the scene in relation to the light source 52 (by again being sent an appropriate draw call for that purpose), so as to generate a dynamic shadow map 55 representing the effect of that light source on the scene.

Then, the scene will be rendered for its final display (again by the issuance of appropriate draw calls to the graphics processor), which rendering process will apply the generated dynamic shadow maps 54, 55 to the scene as it is rendered (at the texture mapping stage), in order to reflect the effect of the light sources 52, 53 on the scene as it is viewed from the viewpoint 51.

In other words, the rendering of the scene for display (the final rendering draw calls for the scene) will use the previously generated shadow maps 54, 55, so as to apply the effects of the light sources 52, 53 on the scene as it is displayed.

It can be seen from the above that in existing graphics processing systems and processors, any graphics data that may be needed from memory (e.g. to be fetched from memory by a graphics processing unit) in order to process (and when processing) a scene for display is generated and stored in advance of processing (rendering) the scene in question for display.

However, the Applicants have recognised that this can have a number of disadvantages.

For example, it is necessary to provide and allocate sufficient memory to store all the data in this fashion. This can create a relatively large overhead in terms of the memory footprint required to store all the data required for a scene.

This is a particularly significant issue in respect of dynamics graphics data, such as tile lists, dynamic textures, etc., because not only is there a need to store such data, but the amount of such data that needs to be stored can vary on a scene-by-scene basis and can be very difficult to predict (since it can depend, e.g. in the case of tile-lists, on the distribution of primitives in a scene, which can vary significantly from scene to scene). This can make the efficient use of memory for such data difficult.

It is known in immediate mode rendering architectures to try to order primitives for rendering such that primitives that reference any dynamic data (e.g. textures) are rendered first, so as to try to allow the "dynamic" data to be discarded (and the memory it uses to be freed) at the earliest opportunity.

However, many primitives can require contributions from multiple dynamic data sets (e.g. textures), such that those primitives must be passed through the rendering process several times to achieve the final rendered image. This can make it difficult to discard the dynamic data at an early stage in the rendering process. In any event, an initial memory allocation for all the dynamic data must still be made.

Furthermore, such attempted "early" discarding of the dynamic data may not be so possible in tile-based arrangements, as the dynamic data may need to be retained until the last tile of the scene is rendered (and again, in any event, an initial memory allocation for all the dynamic data must still be made).

The Applicants believe therefore that there remains scope for improvements to techniques for handling data, and in particular dynamic data, such as dynamic textures and tile lists, in graphics processing systems.

According to a first aspect of the present invention, there is provided a method of processing data in a graphics processing system, the method comprising:

the graphics processing system:

determining whether data that is needed for processing data to be processed by the graphics processing system is already available in memory; and if the data is not available in memory, generating the required data and then using the generated data for processing the data to be processed.

According to a second aspect of the present invention, there is provided a graphics processing system, the system comprising:

means for determining whether data that is needed for processing data to be processed by the graphics processing system is already available in memory; and means for, when the graphics processing system determines that the data that is needed for processing data to be processed by the graphics processing system is not available in memory, generating the required data and then using the generated data for processing the data to be processed.

In the present invention, the graphics processing system is configured and operable such that if data that it needs is not available in memory, the graphic processing system will then generate the data for use. This means that, for example, with the system of the present invention, if data that is required for graphics processing (e.g. for rendering a fragment) is not already stored for use, the data can be generated at the time it is needed.

It should be noted here that the present invention should be contrasted with existing dynamic data generation arrangements, since in those arrangements the dynamic data is generated in response to commands received by the graphics processing system, not in response to data being found not to be present in memory (nor, accordingly, is there any step of initially determining whether the data is available in memory before generating it in existing dynamic generation arrangements).

The present invention can, inter alia, allow data needed for processing data in a graphics processing system (e.g. for fragment rendering) to be generated "on-demand", when it is needed, in contrast to always preparing and storing that data in advance. This also means that the generation of the graphics data (e.g. of dynamic graphics data) can be "deferred" until the time the data is needed and can be more closely coupled to the point of use of the data, rather than having to generate such data in advance of processing a scene for display.

The ability to generate data that is required in an "on demand" fashion in the manner of the present invention has the advantage that, for example, the need to generate and store in advance of processing a scene for display all of the graphics data that may be required to be fetched when processing the scene for display can be avoided, thereby, e.g., facilitating alleviating or even removing, the issue of memory footprint required for storing such data in advance.

As data may be generated "on demand" if it is needed in the present invention, the present invention can also be used to make it more likely that only data that is going to be required will be generated (and, e.g., stored). (This is in contrast to arrangements that generate and store all graphics data that could be required in advance, as in that case typically the entire data set will be generated and stored in advance (as it is not generally possible to determine in advance which data (e.g. which parts of a dynamic texture map) will actually be needed).)

Thus the present invention can also help to avoid the redundant generation and storage of (unused) graphics data.

Moreover, as will be discussed further below, because in the present invention the graphics data can be calculated "on demand", at the time it is needed, the present invention facilitates more flexibility and/or predictability in terms of the storing of such graphics data as part of the graphics processing process. For example, the present invention could be used to remove the need to store such data for longer term use at all (since the data can always be generated again, if it is needed again).

Indeed, the Applicants have recognised that the present invention provides in particular the ability to constrain and/or guarantee the amount of such data, such as, and in particular, dynamic graphics data, such as tile-list data, that will ever be stored by the graphics process, since if the data is not stored, it can always be generated as and when it is needed. This would allow, for example, the system to set a fixed size to the memory allocated for storing, e.g., dynamic graphics data, such as dynamic textures, and/or tile-lists, etc., since if data that exceeds the allocated memory size is to be generated, existing data in the memory can safely be discarded to free-up memory space (as the "discarded" data can always be generated again, should it be needed again later). The present invention can accordingly be used to ensure that the memory usage for such data can be predictable in use, unlike in existing systems where all such data must be generated and stored in advance.

The present invention similarly facilitates the use of "weak" memory allocations (i.e. memory allocations that can be "reclaimed" for other purposes, e.g., by the operating system, when desired) for such data, as the data can always be generated if the memory storing it has been taken back for another purpose.

Thus the present invention not only facilitates reduced memory footprints for storing such data, but can also be used to, e.g., guarantee a maximum, fixed, predictable, and/or selected memory allocation for such data, and/or allows any memory being used to store such data to safely be freed (re-allocated) should it be needed for other purposes. Such knowledge of, and the ability to control (and constrain) memory usage by the graphics system can be very advantageous, particularly in graphics systems where memory resources may be limited, such as in and for low-power and/or portable devices and in embedded graphics systems.

The present invention can be implemented in respect of any data processing that the graphics processing system can, or is being used to, carry out. Thus it may, for example, be used in relation to processing data that may not in fact be immediately (or indeed, ever) displayed on a display, such as data that is in preparation for processing data for display, and/or that is in an intermediate or preliminary form and that will be processed further before it is in its final, "display" form.

The present invention may also be used where the graphics processing system is being used to process and produce data that is not necessarily a scene for display or, indeed, that can be "viewed". This may be the case where, e.g., the graphics processing system is being used to carry out other forms of image or data processing that may not in fact output a "viewable" scene (i.e. the resulting frame buffer output may be data for a purpose other than controlling a display and/or data that can't be visualised directly).

However, in a particularly preferred embodiment, the data and the graphics process to which the present invention is applied is the processing of graphics data for display, and most preferably the generating of image data for display (e.g., and preferably, the processing of graphics data to generate the final, display, frame buffer output that will be applied to the display to display the scene in question). This is because the processing of image data for display in a graphics processing system will typically require dynamic graphics data, and so the present invention is particularly applicable to such processing.

Thus, in a particularly preferred embodiment, the data for which it is determined whether it is available in memory or not (and, if necessary, generated) is data needed for processing graphics data for display, and most preferably data needed for generating image data for display (and preferably for providing the final frame buffer output for display).

The determining of whether data that is needed for processing data to be processed by the graphics processing system is already available in memory can be performed and implemented in any desired and suitable fashion. Thus it could, for example, and in one preferred embodiment does, comprise the graphics processing system checking directly whether the required data is present in memory or not. Alternatively, it could, for example, comprise checking information, such as a record, for example in the form of a database, lookup table and/or bitmap, indicating what data exists and does not exist in memory to determine whether the data that is needed is already available in memory. The system may, for example, have direct, conscious, or indirect, unconscious knowledge of data that is in memory and use and check that information accordingly to determine whether the data that is needed is already available in memory or not.

In a particularly preferred embodiment, the step of or means for determining whether data that is needed for processing data to be processed by the graphics processing system is already available in memory comprises the graphics processing system attempting to fetch from memory the data that is needed for processing the data to be processed by the graphics processing system. In this case, the fetching of the data could, as discussed above, comprise the graphics processing system attempting to fetch the data itself directly from memory (and then finding that it is present in memory or not, accordingly), or it could comprise a more indirect fetching process, in which the graphics processing system first checks a record, such as a database, lookup table, or bitmap, indicating what data exists and does not exist in memory, and then from that record information either then fetching the data or determining that the data is not available in memory.

It will be appreciated that in operation of the present invention, a graphics processing system would typically first recognise that additional data is needed to process data, and then determine whether that additional data is already available in memory or not. Thus, in a preferred embodiment, the present invention includes means for or steps of recognising that additional data is needed for processing data to be processed by the graphics processing system, and then determining whether the additional data that is needed for processing the data to be processed by the graphics processing system is already available in memory (or not).

Similarly, as will be appreciated by those skilled in the art, in operation of the present invention, the graphics processing system will typically receive data for processing and then at some point recognise that additional data is needed to process the received data and then determine whether the additional data is available in memory (e.g. attempt to fetch that additional data from memory).

Thus, in a preferred embodiment, the present invention includes means for or steps of receiving data for processing, determining that additional data is needed for processing the received data, and then determining whether the additional data is available in memory (e.g. attempting to fetch the additional data from memory).

It should also be noted here that the determining of whether the additional data is available in memory (e.g. the attempted fetching of the data) (and/or the recognition of the need for additional data) may be triggered at the point that data is needed (i.e. at the time the (additional) data is needed for processing other data), but it may be triggered at some other point in the graphics processing, for example in advance of the time that the (additional) data will actually be used by the graphics processing system. This latter situation may occur where, for example, pre-fetching of data (such as may be likely to be the case for, e.g., dynamic texture data) is used. In this case the attempted fetching of the data (the determination of whether the data is available in memory) (and, preferably, its generation (if necessary)) may be and preferably is triggered and carried out at the "pre-fetch" point, not at the point where the "pre-fetched" data is actually to be used.

Thus, in one preferred embodiment, the determination of whether the data is available in memory, and the generation of the data if necessary in the manner of the present invention, is triggered in advance of the time at which the data will actually be used.

Similarly, in another preferred embodiment, the determination of whether the data is available in memory, and the generation of the data (if necessary), is triggered at the time the data is desired to be used (will be used), for example, and preferably, at or by the graphics process and/or processing unit that is to use the data.

It will be appreciated that in practice, the determination of whether the data is available in memory (e.g. attempted fetching of the data), etc., will typically be triggered by a given process and/or processing unit of the graphics processing system recognising the need for data from memory and then proceeding accordingly. Thus, in a preferred embodiment, the present invention comprises a process and/or processing unit of the graphics processing system determining whether data is available in memory (e.g., and preferably, attempting to fetch data from memory), and the graphics processing system then, if the data is not available in memory, generating the required data. Similarly, the present invention preferably comprises a graphics process and/or processing unit receiving data to be processed, recognising the need for data from memory to process the received data, and determining whether the data is available in memory (e.g., and preferably, triggering an attempt to fetch the data from memory).

The system and process of the present invention can be used for and implemented in any desired and suitable process and/or processing unit of the graphics processing system and/or that is to or can be performed or to perform during processing of data by the graphics processing system (i.e. any process or processing unit that will or could require, e.g. the fetching of, or that will or could fetch, data from memory).

The present invention could be implemented in and for every graphics process and/or processing unit that may need to "fetch" data from memory in its operation, or it could only be used for certain processes and/or in respect of certain data, etc., if desired (with in that case other processes that may require data from memory still having that data prepared and stored in memory in advance). In a preferred embodiment, the present invention is applied to and/or used for particular, preferably selected, graphics processes, processing unit(s) and/or data, etc.

In one particularly preferred embodiment, the graphics process that the present invention is applied to is a rendering process, and most preferably a process for rendering graphics fragments for display. This is advantageous because it can be common for the rendering process to require dynamic data, such as dynamic textures, and so implementing the present invention in the rendering stage of the graphics processing can be particularly advantageous.

In another preferred embodiment, the present invention is also or instead implemented at the stage that primitives are to be issued for rendering in a tile-based rendering system. In this case, the data that is generated in an "on demand" fashion in the manner of the present invention may comprise, e.g., the tile-lists themselves. (As will be discussed further below, the Applicants have recognised that an ability to "defer" the generation of tile-lists (as the present invention can provide) may be particularly advantageous in tile-based rendering systems.)

Similarly, in the case of a tile-based graphics processing system, in a preferred embodiment, the process and system of the present invention is implemented as tiles of the scene are processed for display.

In one preferred embodiment, the present invention is implemented before the rasterisation process. This may be useful when the dynamic data is tile lists. The present invention is preferably also or instead implemented after rasterisation. This could be the case where the dynamic data is, e.g., dynamic texture data.

The processing stage or unit of the graphics processing or processor in or for which the present invention is applied and implemented can similarly be any desired and suitable such stage or unit. In a preferred embodiment, it is one or more of a rendering, fragment shading, vertex shading and/or geometry shading, unit or stage of the graphics processing or processor that can and preferably does operate in the manner of the present invention.

In a particularly preferred embodiment, it is a programmable processing unit of the graphics processing system, preferably a graphics processing "shader" or "shader unit", that operates in the manner of the present invention, i.e. by which or for which the on-demand data generation in the manner of the present invention can be or is triggered.

(As is known in the art, it is increasingly common for graphics processors to include one or more programmable or configurable processing units that can, e.g., be programmed to execute and perform desired graphics processing programs on graphics data, as it is processed for display. Those programmable units are commonly referred to as "shaders", and are typically distinguished from dedicated, "fixed-function" graphics processing units or stages. Examples of graphics "shaders" include fragment shaders (which are used to perform rendering operations on graphics fragments), vertex shaders (which are used to perform vertex shading operations on graphics vertices) and geometry shaders (which are used to perform geometry shading (generation) operations on geometry data).)

Graphics "shaders" or "shading units", as they carry out programmable functions on graphics data, typically require other data to carry out their processes. The Applicants have recognised that an ability to derive such "other" data "on demand" in the manner of the present invention would be particularly advantageous.

In these arrangements, the programmable graphics processing unit is preferably a fragment shader, a vertex shader and/or a geometry shader.

The data that can be generated "on demand" in the is manner of the present invention can similarly be any desired and suitable such data, e.g. any data that may need to be fetched from memory when processing data using a graphics processing system (and most preferably data to be used when processing graphics data for display). As discussed above, the present invention could be implemented in respect of all such data, or may be used for, particular, e.g., and preferably, selected, such data only.

In a particularly preferred embodiment, the data that the present invention is used for (the data that is attempted to be fetched from memory, etc.) comprises data that is typically generated or calculated on a scene-by-scene basis, such as, and preferably, dynamic graphics data as discussed above.

Thus, in a particularly preferred embodiment, the data that is sought in memory, and, if necessary, generated, in the present invention, comprises dynamic graphics data.

Such dynamic graphics data could, e.g., comprise, as discussed above, so-called dynamic texture data (a dynamic texture map and/or texel(s)). Such dynamic textures are, as is known in the art, created in use for a specific scene and typically used to create effects such as shadows and more complex light volumes and lighting effects, and may, e.g., be created using some or all of the existing data set for the scene. Dynamic texture data and maps can include, for example, normal maps, bump maps, shadow maps, displacement maps, etc., (and corresponding such texture data) as is known in the art.

Other examples of "dynamic" data that could be needed in graphics processing include "dynamic" geometry data for a scene, i.e. geometry, such as vertices, that is to be used for a scene and that has to be generated in use for the scene, e.g., from higher level descriptions of objects to be rendered.

Another example of dynamic graphics data to which the present invention can be applied is vertex data, where, for example, the initially defined vertices (vertex data) for a scene may need to be modified and/or to undergo vertex shading processes, such as needing to be transformed (e.g. rotated, scaled, displaced, etc.), and/or "lit" (e.g. have their appearance adjusted depending on the light sources in the scene to be displayed), to generate the vertex data (e.g. attributes) actually to be used when rendering the scene.

Such processes that result in modified vertex data and that have to be carried out on a scene-by-scene basis can be viewed as providing "dynamic" vertex data.

A further example of dynamic graphics data is tile-lists (the binning data structures) that are prepared in tile-based rendering systems, since the sorting (binning) of primitives (and/or other geometry) into tiles (the preparation of the binning data structures) can only take place on a scene-by-scene basis, as the number and distribution of primitives (and/or geometry, etc.) will change for each successive scene.

In each of these cases, the data must be generated on a scene-by-scene basis and typically will vary as between scenes. The present invention can therefore, as discussed above, usefully and advantageously be applied to such data.

Thus, in a particularly preferred embodiment, the data that is sought in memory, and, if necessary generated, comprises one or more of: dynamic texture data (e.g. all or part of a dynamic texture map), (dynamic) vertex data (e.g. vertex data that has undergone vertex shading processes, such as transformations and lighting (i.e. modified, e.g. transformed and lit vertex data)), a tile list or lists (e.g. a list of geometry, e.g., primitives, that is to be processed for a tile of a scene in a tile-based rendering system), and/or dynamic geometry data (e.g. (new) vertices that are to be generated for a scene), etc.

It is similarly preferred that the data that is sought in memory, and, if necessary, generated in the present invention, comprises texture data, vertex data, geometry data and/or tile list data (a tile list or lists).

In one particularly preferred embodiment, the data that is, if necessary, generated on-demand in the manner of the present invention comprises vertex data and tile-list data. This may particularly be the case where, for example, graphics objects are initially sorted at a lower resolution and/or hierarchy than individual primitives and/or tiles, such that when, for example, the graphics processing system needs to process a particular tile it may not have a sufficiently detailed information about that tile in order to be able to process it.

This could be the case where, for example, the initially prepared tile-lists do not solely list individual primitives but list, e.g., other descriptors of objects to be rendered, such as coarser or more abstract descriptors of objects to be rendered, such as descriptors representing groups of plural individual primitives and/or descriptors defining objects in a non-primitive form, etc. Then, when the tile is to be processed, the other, e.g., coarser or more abstract object descriptors will need to be converted into "true" primitives and a new tile list or lists listing the "true" primitives for the tile prepared. This may also require new vertex data, representing the "true" primitives, to be generated.

The "true" primitive tile list(s) and vertex data in these arrangements could be generated on-demand in the manner of the present invention, and that would allow, for example, the other, e.g. coarser descriptions of objects to be retained for longer in the graphics processing if desired.

In other words, in a situation where the graphics processing system may find it needs more detailed data than is currently available, the present invention would allow such "more-detailed" data to be generated on-demand as it is needed.

As discussed above, the operation in the manner of the present invention will in general start with a graphics process and/or processing unit recognising or identifying the need for data from memory that is required (either by itself or for a subsequent process and/or processing unit) and then determining whether that data is already available in memory (e.g. triggering an attempt to fetch that data). Thus, the present invention preferably further comprises a step of or means for a graphics process and/or processing unit recognising or identifying the need for data that is or will be required, and then determining whether that data is already available in memory (e.g. triggering an attempt to (or attempting to) fetch that data).

The identification of the need for data from memory can be carried out in any desired and suitable manner, for example in the existing manners of such arrangements. For example the graphics processor or processing unit may by its nature, always need to "fetch" data, and/or may receive a command or instruction to do so, and/or may be triggered to do so, by data that it receives for processing, etc.

For example, a graphics fragment for rendering may have associated with it texture coordinates for a dynamic texture map. In response to this, the rendering process (e.g. rendering unit, e.g. fragment shader) will try to fetch the relevant texels from a texture map store, and if those texels are not available, the process to calculate those texels can then be triggered.

In other situations, the rasterising process, for example, may, e.g., need (transformed and lit) vertex data in order to be able to rasterise a primitive it receives for processing. In this case, upon receipt of the primitive, the rasteriser will seek the relevant vertex data for the vertices of (associated with) the primitive from memory (e.g. a vertex data array). If the vertices (vertex data) are not available in memory, the process to generate the vertex data in the manner of the present invention can then be triggered.

Similarly, if a tile is issued for processing in a tile-based rendering system, the system will first attempt to fetch tile-list data to determine which primitives (and/or other geometry) should be processed for a tile. If the appropriate tile-list data is not available in memory, the process to generate that data can then be triggered.

Similar arrangements can be used for other forms of (e.g. dynamic) data and graphics processing.

Thus, in a preferred embodiment, the present invention includes steps of or means for, a graphics process or processing unit receiving data and/or a command to be processed, and in response thereto recognising or identifying the need to fetch from memory other data required for processing to be carried out, and then triggering an attempt to (or attempting to) fetch that data from memory.

The Applicants have also recognised that it may be the case that the required data is available in memory, e.g. when the attempt to fetch that data is made, for example because, as will be discussed further below, it has previously been generated and stored in the manner of the present invention. In this case, it would not be necessary to generate that data in the manner of the present invention. Thus, where the required further data (e.g. dynamic data) is available in memory, then the graphics processing system preferably proceeds in its normal fashion, e.g., with the data being fetched from memory and then used by the relevant processing unit.

Thus, in a preferred embodiment, the present invention comprises a step of or means for, if the required data is available in memory, fetching that data from memory and using the fetched data for processing the data to be processed (for carrying out the process that requires the data).

As discussed above, the step of or means for determining whether the data is available in memory (e.g., and preferably of attempting to fetch the data from memory) can comprise any suitable and desired such step or means, such as any known and/or suitable technique for loading, obtaining or retrieving data from memory.

As will be appreciated by those skilled in the art, the step of determining whether the data is available in memory (e.g., and preferably of attempting to fetch the data can, e.g., comprise seeking that data from a cache memory and/or from main memory of or available to the graphics processing system, etc., as is known in the art. (In general, any desired and suitable memory scheme can be used for the data. The present invention is applicable, however the data may be stored.)

It would be possible to generate the data in the manner of the present invention if the data is not available in a memory (in a particular or selected memory, e.g. the "first" memory) that the data is sought from (e.g. attempted to be fetched from) (e.g., where the data is sought from a cache memory in the first instance) or, e.g., only if the data is not available in any of the memories that it could be stored in (such that, for example, in the case of a "cache miss", rather than then immediately generating the data in the manner of the present invention (although this would be possible), the system first seeks the data in "main" memory, and only if the data is not available in main memory is the data generation in the manner of the present invention triggered). Again, the present invention is applicable to all suitable memory scheme arrangements.

The step of or means for generating the further data in the present invention can similarly comprise any suitable and desired such step or means, such as any known and/or suitable technique for calculating or creating the data in question.

Where further data is generated in the manner of the present invention, then the generated data can be used for the process it is generated for in any desired and suitable manner.

In a preferred embodiment, the generated data is provided and/or made available to the process and/or processing unit that requires it, once it has been generated. This is preferably done by storing the generated data in memory, so that it can then be fetched therefrom and used by the graphics process and/or processing unit in the normal manner (e.g. when the process that needs the generated data is restarted or attempted again).

Thus, in a preferred embodiment, the present invention includes means for or steps of providing and/or making available the generated data to the process and/or processing unit so that it can be used for and/or by the process and/or processing unit in question. Most preferably, the present invention includes means for or steps of storing the generated data in memory, and, preferably, the graphics process and/or processing unit, etc., then fetching that stored data and using it for the graphics process in question.

Where the generated data is to be stored, then the data can be stored in any desired and suitable manner, such as, and preferably in "normal" manner for such data. In a preferred embodiment, the generated data is stored in a cache memory or memories of or accessible to the graphics process or system, etc. It would, of course, be possible to also or instead store the data in non-cache, e.g., main, memory, if desired. Again, any suitable and desired memory scheme can be used for the data as desired.

The step of and means for storing the generated data may also, and in a preferred embodiment does also, include allocating memory for the purpose of storing that data, if necessary, and/or as desired. In a preferred embodiment, there may be and preferably is a predetermined allocation of memory for any (dynamic) data that is generated in the manner of the present invention. Alternatively, in another preferred embodiment, a dynamic memory allocation scheme can be (and preferably is) used. For example, there could be a predetermined pool of memory available for generated data. This would allow, for example, a fixed limit to be set on the amount of memory available to (and used by) dynamic graphics data (and limit the memory usage of dynamic graphics data).

It would be possible in the present invention to discard the data that is generated in the manner of the present invention once it has been used for the process in question, and, indeed, in one preferred embodiment of the present invention, this is what is done.

(Indeed, as discussed above, an advantage of the present invention is that as data can be generated "on demand" in the system of the present invention, there is no need to store the data for future use and that can thereby reduce any data storage requirements on the system.)

However, the Applicants have recognised that it may in some circumstances be desirable to store the data that is generated in the manner of the present invention for later use (e.g., and preferably for use with other, e.g., and preferably, subsequent, graphics processes, graphics entities (e.g., fragments), etc., to the process or entity (e.g., fragment) that the data was first generated for).

For example, it may be that a given piece of dynamic data, such as a dynamic texture map or texel, will be likely to be used by other, subsequent fragments. In this case it could be desirable to store the generated texture data (texels) so that it is available for later fragments, instead of, e.g., re-generating the data when the next fragment that needs it is being rendered. This may particularly be the case where, as will be discussed further below, more than just the data needed for the process or entity (e.g., fragment) in question is generated at the time the data is generated.

Thus, in one particularly preferred embodiment, the data that is generated in the manner of the present invention is not discarded immediately it is used for the process or graphics entity (e.g., fragment) in question, but instead can be and preferably is stored for later use, for example and preferably so that it can be, or is, available for use with other or subsequent or later graphics processes, e.g., preferably for the processing of other (subsequent) graphics entities (e.g. fragments, primitives, or tiles).

In such arrangements, there could, as discussed above, e.g., be, and are preferably, restrictions on the way that the generated data is stored, for example in terms of the amount of memory that is allocated to such data, and/or the length of time for which such data is held. For example, a limited size (e.g. cache) memory could be allocated to store the generated data, with data being retained and replaced in that memory on a first-in, first-out basis, and/or in accordance with allocated data storage priorities, etc., as desired.

Indeed, as discussed above, it is an advantage of the present invention that it permits flexibility in terms of the way that, e.g., dynamic, graphics data is stored, and in terms of the amount of such data that is stored. This is because, inter alia, by being able to generate such data on-demand, it firstly can mean that, typically, any such data that is stored is more likely to be restricted to data that is actively required (such that less or no memory need be allocated or reserved for data that will not actually be used).

The ability to generate such data "on demand", at or closer to the point of its use, also removes the need to always store such data until it is known to no longer be needed, because if data is discarded (or not stored in the first place), it can always be re-generated if it is found to be needed again. This means that, for example, previously stored such data can be discarded to recover memory, if desired (or a decision can be made not to store the data in the first place). This may be particularly beneficial in, for example, embedded systems, where memory resources may be low and/or at a premium.

In these situations there may, e.g., be some tradeoff between storing the data and the possible need to repeatedly regenerate the same data, but an advantage of the present invention is that it permits flexible tradeoffs between and optimisations of these requirements.

Where data needs to be and is generated by the graphics processing system (e.g., the rendering process) in the manner of the present invention, then it would, e.g., be possible simply to generate only the actual data (e.g. texel) that is needed for the process (e.g., graphics entity (e.g., fragment)) in question (and, indeed, in one preferred embodiment of the present invention, this is what is done).

However, the Applicants have recognised that in some circumstances it may be desirable to generate more data than solely the data that is needed for the process (e.g., for processing the fragment) in question.

For example, in the case of dynamic textures, if a given texel or texels are required by one fragment, there may be a reasonable expectation that some of the surrounding texels will be required by other fragments (as adjacent fragments will typically use adjacent regions (e.g. texels) of a texture map). In this case it may be more efficient to generate all the texels that the system might expect to need to use at the same time, rather than generating a smaller set of texels for each fragment individually.

Thus, in a particularly preferred embodiment, the data generation process of the present invention can, and preferably does, generate more data than the data that is required for the process (e.g., for processing the fragment) in question, such as, and preferably, data that is geographically close or adjacent in the scene or frame or image, etc., to, and/or in the same region of the scene (or image or frame, etc.) as, the data that is required for the process in question.

For example, and preferably, particularly in a tile-based system, the system could calculate all the (dynamic) data needed for a page or tile of the scene to be displayed, when data for that page or tile first comes to be generated. It would also, e.g., be possible to generate the entire data set (e.g. dynamic texture map) to which the data to be calculated relates, when data for that data set first comes to be generated.

Thus, in a particularly preferred embodiment, the data that is generated (and, preferably, stored) when data generation is triggered in the manner of the present invention (i.e. for a given data generation process) can preferably comprise (and can preferably be selected from) a range of different "sizes" or amounts of such data, such as, and preferably, in relation to the extent of the region that the data is generated for.

Most preferably the full data set (e.g. dynamic texture map), or a (selected) sub-set of the full data set (such as the data needed for a given page or tile or region, etc.), and/or particular, individual data values (e.g. a texel or texels) (e.g., and preferably, just the data value(s) needed for the process in question) can selectively be generated (and stored).

Indeed, it is an important advantage of the present invention that it facilitates the ability to generate more or less data in use for any given data generation process, as that then facilitates, e.g., the ability to have flexible tradeoffs and optimisations between, e.g., data generation requirements, performance and overheads, and the memory footprint required for storing the data.

Any selection or choice of the amount of data to be generated at any given time can be made as desired. In a preferred embodiment, such choice is based on the processing overhead for calculating the data, or the memory requirements and/or availability for storing the data, and preferably both. For example, if the data generation overhead is small (e.g. the calculation is quick and simple), and/or data storage (memory) is limited, it may be preferable to generate the data as and when it is needed each time. On the other hand, if the data generation overhead is large, and/or data storage is readily available, it may be preferable to generate more data in any given data generation process.

The data that is generated in the manner of the present invention can be generated in any desired and suitable manner. It is preferably generated by performing the usual processes and, e.g., calculations, that would be required and performed to generate that data.

For example, in the case of dynamic textures, the actual dynamic texture map data (texels) to be used could be and is preferably generated by "rendering" dynamic texture objects, such as primitives, that have previously been defined for that purpose, as is known in the art.

Similarly, the "on-demand" generation of tile lists in the manner of the present invention could be and is preferably generated by binning primitives to tiles, using, e.g., exact binning or a bounding box binning technique, as is known in the art.

For the generation of (dynamic) vertex data (e.g. vertex shading), the vertex shading processes (e.g. transformation and lighting processes) could be carried out in the normal manner.

(It should be noted here that the intention in the present invention is that the data is actually generated or calculated if it is not available in memory, and this should be contrasted with arrangements where, for example, the data may already exist but needs to be fetched from another source (e.g. external memory) or, e.g., exists in memory, but needs to be converted to another representation of the data for use.)

It would be possible when generating the data in the manner of the present invention to carry out the "full" data generation process (i.e. from the beginning, using the "raw" data for that process) at that time.

However, the Applicants have recognised that it may be the case that some of the data generation process and/or required data for that process will already have been carried out and/or available at the time the data comes to be generated in the manner of the present invention, for example because calculations have already been done and/or data structures have already been prepared earlier in the graphics processing, for example prior to rasterising or as part of rasterising the primitives to their fragment positions.

For example, in the case of a dynamic texture, it may be that at the fragment rendering stage, the texture scene information for the dynamic texture has already been prepared, in which case only the "rendering" of the texture to generate the dynamic texture map (texels) would need to be done at the data "generation" stage of the present invention. On the other hand, if only the "raw" texture objects for the dynamic texture exist, then the data generation step will have to first generate the texture scene information, and then render the scene to generate the dynamic texture map (texels) (and so on).

Thus, the data generation process of the present invention can preferably take account and advantage of, and make use of, whatever data and data structures may already exist and are available to the graphics process (rather than repeating any generation of such data, etc), so far as is possible or reasonable. (Indeed, as will be appreciated by those skilled in the art, the data generation process that is carried out in the manner of the present invention preferably does, and will typically, depend on what data and data structures, etc., exist and are already available to the graphics process.)

Thus, in one preferred embodiment, only the final, still to be performed, data generation processes are carried out at the time the data is to be generated in the manner of the present invention, rather than repeating calculations, etc., for which the resultant data is already available.

In a particularly preferred embodiment, the data generation process of the present invention makes use of any sorting, such as, and preferably, sorting by scene position or location, e.g., tiling, of the data (e.g. geometry) that it is to use, for example, and preferably, to identify which data (e.g. geometry) it will need to use to generate the data that is required (rather than, e.g., simply using all the data that is available). For example, in the case of dynamic textures, if the geometry (e.g. primitives) to be used to generate the dynamic texture have been tiled, then the data generation process could and preferably does identify the tile or tiles to which its current data requirement relates, and then uses the data for that tile or tiles only for its data generation process.

Thus, in a particularly preferred embodiment, the data generation process includes a step of or means for identifying a sub-set of all the available data and/or information that might be needed for that process and then using only that sub-set of data during its data generation process. This has the advantage that the data generation process can thereby be simplified and/or reduced in its extent (since it can help to ensure that only data that may affect the data generation process will be used for that process).

As discussed above, in one preferred such embodiment, the sub-set of data to use is identified from a sorting of the data (e.g. and preferably, the geometry and/or graphics entities) to be used for the data generation, e.g., and preferably by location or position, and most preferably from a tiling of or by tiling, the data (e.g. geometry) that is to be used for the data generation process.

Such "tiling" of the data to be used and the use of such sorting of the data may be particularly beneficial where, for example, the data to be generated relates to particular regions or locations in the scene to be rendered (i.e. has an associated position or location in the scene), such as would be the case, for example, for texels in a dynamic texture map. In this case, by sorting the data to be used geographically (by its (e.g., and preferably, x, y) position in the scene), redundant processing of data may be more readily avoided.

In these arrangements, it may be the case that some sorting (e.g. tiling), etc., of the data (e.g. geometry) to be used by the data generation process has already been carried out (e.g. at the rasterising stage). In this case, the data generation process of the present invention could and preferably does use and take advantage of this already-performed sorting (e.g. tiling), of the data, etc., as appropriate.

It would also or instead be possible to do the sorting, etc., of the data (e.g. geometry) to be used, e.g., on a position or tile-by-tile basis, at the time (stage) of the data generation in the manner of the present invention. For example, the data generation process could be arranged or configured to perform an initial tiling of the data (e.g. geometry) that it is to use. This may, for example, be desirable where the data has not previously been tiled or sorted (e.g. at an earlier stage in the overall graphics process).

Thus, in a preferred embodiment, the "on-demand" data generation process of the present invention can and preferably does include a step of or means for sorting, preferably tiling, data (and preferably geometry) to be used in the data generation process, preferably on the basis of positions or locations in the scene associated with the data (e.g. geometry) and/or which the data (e.g. geometry) is known to affect.

Most preferably, the system or process can selectively sort (e.g. tile) the data in use, and/or can be selectively configured to do so. Such selection may be, and preferably is, based on, for example, the extra processing required to do the sorting (e.g. tiling) at the data generation stage as compared to any processing that may then be saved when using the "sorted" data to generate the further data that is required (that is to be generated), e.g., for rendering a fragment.

Where data is sorted, e.g., tiled, then as will be appreciated by those skilled in the art, the sorting (e.g. "tiling") process can be carried out as desired, for example in the case of tiling using any desired tile size and shape, and exact binning or bounding box binning (or any other sorting technique), as desired, etc.

The Applicants have further recognised that in some circumstances it may be preferable to be able to perform some of the required data generation processes in advance of processing the data to be processed (e.g., and preferably, in advance of processing the scene for display), with other processes being performed "on demand" in the manner of the present invention. For example, some data generation processes may be relatively lengthy, and it may not therefore be so desirable to carry out these processes in an "on demand" fashion, as to do so may, e.g., introduce undesirable delays into the, e.g., actual rendering process.

Thus, in a particularly preferred embodiment, the system and/or method of the present invention can be configured such that the overall, "total" data generation processes that are needed to generate the required data can be selectively divided or apportioned as between which of those processes are carried out in advance, and which are carried out at the time the data is required in the manner of the present invention.

Thus, in a preferred embodiment, the present invention comprises means for or a step of, preferably selectively, carrying out, and can preferably be selectively configured to carry out, some (but not all) of the data generation processes that are required to generate the data to be used at an earlier stage of the graphics processing (i.e. in advance).

(This does not detract from the overall concept of the present invention, because there will still be data generation being carried out "on demand", it is just that some (but not all) of the data generation processes may be carried out "in advance". Indeed, an advantage of the present invention is that it provides the flexibility to do this.)

The data generation processes that are required at the time the data is to be generated on demand in the manner of the present invention can be carried out in any desired and suitable processing unit or units of the graphics processing system. Thus, for example, one or more additional processing units could be provided in the graphics processor for this purpose. Such units could, e.g., comprise dedicated, fixed-function, processing units, or could be programmable units (shaders), as desired. The actual units to be provided will, as will be appreciated by those skilled in the art, depend on the nature of the data to be generated.

In a particularly preferred embodiment, existing processing units (e.g., and preferably, programmable such units (shaders)) of the graphics processor (i.e. processing units that are already present for other purposes) are used to generate the data in the manner of the present invention. Thus, for example, in the case of dynamic textures, existing rendering units (e.g., and preferably, fragment shaders) are preferably used to do "on demand" generation of the dynamic texture.

Where existing units of the graphics processor are used for the data generation in the manner of the present invention, then in a preferred embodiment, where possible, processing units that are currently free are used for that purpose.

However, the Applicants have recognised that in many cases there may not be suitable free processing units available to perform the data generation when it is required and so in that case processing units that are already being used will need to be used for the data generation in the manner of the present invention.

Thus, in a particularly preferred embodiment, the present invention comprises a step of or means for allocating processing units of the graphics processor to generate the data in the manner of the present invention.

Such allocation of the processing units to generate the data required in the manner of the present invention can be carried out as desired. In a preferred embodiment, it is done by switching the "context" of the graphics processing system, e.g., rendering pipeline, (i.e. changing the state that is driving the graphics processing), to the required data generation "context".

The (rendering) "state" changes for this purpose could be carried out by changing the state of all the processing units (e.g., of the entire rendering pipeline) to a different state (as is known in the art). However, preferably only the state of selected (the required) processing units is changed (e.g., and preferably, by using the techniques described in the Applicant's earlier patent application GB-A-2420261). Similarly, the state changes (context switching) are preferably implemented on a primitive-by-primitive basis where possible.

Where such a state change is implemented so that the data generation can be carried out, the previous state is preferably stored, so that the processing units (e.g., rendering pipeline) can be returned to their previous state after the data generation is completed.

As will be appreciated by those skilled in the art, the (graphics) process that triggers the requirement to generate the data on demand in the manner of the present invention and/or for which the data is to be generated (e.g. where the generation is triggered in advance by pre-fetching) may be unable to be completed until such time as that data has been generated. Similarly, if processing units of the graphics processor are being used to generate the further data in the manner of the present invention, then that may interrupt processes that those processing units should otherwise be carrying out. Thus, in general, the need to generate data "on demand" in the manner of the present invention could and typically will interrupt other graphics processing. The system and method of the present invention preferably therefore includes means or steps for addressing this issue.

Thus, in a preferred embodiment, the present invention comprises means for or a step of suspending and/or stopping one or more graphics processes and/or the processing of one or more graphics entities (e.g., and preferably primitives and/or fragments) while the required data is generated in the manner of the present invention. Most preferably at least the process, etc., that will need the data to be generated is suspended or stopped, although as will be discussed below, other processes, etc., could be suspended or stopped as well.

For example, it would be possible to stall or pause all of the graphics processing while the required data is generated and made available. However, this could lead to relatively lengthy delays in the graphics processing and so may not always be desirable.

Thus, in a particularly preferred embodiment, only particular (e.g. and preferably, selected) graphics process or processes, etc., are suspended or stopped while the data generation takes place, and, most preferably, the graphics process or system can continue to perform other graphics processing (e.g., and preferably process other graphics entities, e.g. fragments), e.g., and preferably, that are not affected by the data generation process of the present invention. This would then avoid the need to, e.g., stall the entire rendering pipeline while the data generation process takes place. Again, this can preferably be done by appropriate control and switching of the state of the graphics process and/or of individual graphics processing units. In this case, some but not all of the graphics processing would be stalled or interrupted while the required data is generated and made available to the graphics processing system.

It would be possible in these arrangements only to suspend (stall) the particular graphics process (e.g. the processing of the particular graphics entity, e.g., fragment) in question (i.e. that "requires" the data that is to be generated) while the data is generated. However, in a preferred embodiment, the system or process attempts to identify other graphics processes and/or entities, such as primitives, fragments, etc., that may also be affected by the data generation process in question, and, preferably, also suspends or stops stalls those processes and/or the processing of those entities.

For example, in the case of a dynamic texture, there may be other fragments that it is known or can be determined will be affected by the texels to be generated. Similarly, there may be subsequent primitives that will be affected by a stalled primitive (e.g., because they are to be blended with the stalled primitive). In these cases, it may be preferable to also delay the processing of the other fragments or primitives, etc., until the data generation process is completed.

Thus, in a preferred embodiments, more than just the particular graphics process (and/or processing unit) (e.g. and preferably, the processing of the particular graphics entity, e.g., fragment or primitive) that requires the data to be generated in the manner of the present invention is suspended while the data is generated.

The identification of such other graphics processes and/or entities, etc., whose processing may need to be or may desirably be stalled or stopped as a consequence of the data generation process of the present invention can be carried out as desired. In a preferred embodiment, location or position information (e.g., tile position) and/or state information (e.g., rendering state information) is used for this purpose.

Where graphics processing (such as the rendering of fragments) is interrupted in this manner, then it is preferred that the interrupted processing is completed after the data generation in the manner of the present invention has been finished.

Thus, in a particularly preferred embodiment, the present invention comprises a step of or means for carrying out or completing any processing that is interrupted by the need to generate data in the manner of the present invention (after the required data has been generated and made available to (provided to) the graphics processes, etc.).

Such performing of any processing that has been stalled or interrupted by the need to generate data in the manner of the present invention can be carried out as desired. For example, the graphics processes (and/or the processing of the graphics entities, e.g., fragments or primitives) that have been interrupted could be cancelled completely, and then carried out again (from the beginning) once the data generation is completed. Thus, for example, in the case of rendering fragments, any fragments affected by the data generation process could be cancelled and then re-issued for rendering once the data generation process has been completed.

In a preferred embodiment, the interrupted processes are re-started at the point they were interrupted, or at some intermediate point between the point at which they were interrupted and starting them at the very beginning.

In other words, rather than completely starting the processing again, the "interrupted" processing, etc., is preferably either re-started at the point it was interrupted (suspended), or rolled back to some intermediate stage. For example, in the case of a tiling system, the processing could be and is preferably rolled back to the start of the processing of the tile in question.

In each case, any data necessary to identify the processes in question, and how to carry out those processes (e.g., about how to re-issue cancelled fragments) once the required further data has been generated, is preferably stored in an appropriate manner to allow the interrupted processes to be carried out at the later time.

Thus, in a preferred embodiment, where a process or processes, etc., is interrupted by the data generation process of the present invention, the identity of any interrupted processes, etc., together with any relevant information such as state information and the point at which the process, etc., is to be rolled back to, is stored, so that the interrupted processes, etc., can be recommenced at a desired point in the future.

For example, in the case of rendering fragments, the current status of any affected fragments could be stored (together with their rendering state), and thus the processing recommenced using that data once the data generation process has been completed.

Such storing of data (e.g., of "fragments") etc., is preferably done outside of the rendering process (e.g. pipeline), as it may not be possible, e.g., simply to loop fragments back through the processing units in order to "stall" them, as the processing units may be needed for the data generation process.

As discussed above, an advantage of the present invention is that it can avoid the unnecessary generation of (e.g. dynamic) graphics data that will not in fact ever be used in the processing of a scene for display. This advantage is increased if the overall graphics process includes and uses techniques for early culling and removal of data from the graphics processing (as in that case, there will never be any "on demand" data generation for the culled data).

Thus, in a particularly preferred embodiment, the present invention further comprises a step of or means for attempting to remove or cull (graphics) data from the (graphics) processing before the stage at which the data generation in the manner of the present invention would be carried out. Such "early" culling of data (e.g. fragments, primitives, etc.) can be carried out as desired, for example and preferably by using hidden surface removal techniques, such as early depth (Z) testing, an occlusion culling scheme on geometry, etc. In a preferred embodiment, an (early) visibility test is used.

In a preferred such embodiment, a test is made to try to identify any geometry that will not appear in the final scene, and if such geometry is found, then that geometry (and preferably any data associated solely with it) is discarded. Such a test could, e.g., and in a preferred embodiment does, comprise a test to see if the geometry will fall entirely outside the visible frame to be displayed.

In a preferred embodiment, a test is also or instead made to try to identify any dynamic data (e.g. dynamic textures) that will not in practice be required for rendering the scene for display, and if such data is found, then that data is preferably discarded. In a tiling-based system, this is preferably carried out by identifying dynamic data sets (e.g., and preferably, dynamic textures) that are not tied to any binned primitives (i.e. primitives that appear in tile lists for the scene to be rendered) at all (as if a dynamic data set is not tied to a binned primitive, it can be assumed that it is not tied to any primitive that will be present in the view frustum).

Thus, in a particularly preferred embodiment, the present invention includes means for or a step of searching for and/or attempting to detect or determine dynamic data sets that will not be used when processing a scene for display, and, preferably, discarding any dynamic data sets from further processing in relation to the scene that are found not to be used for the scene. This search is preferably carried out in advance of any processing of the scene for display, and, in a tiling system, preferably after the stage at which the scene geometry (e.g. primitives) has been sorted (binned) into tiles, and preferably by trying to identify dynamic data sets that are not tied to any binned geometry (i.e. geometry that is included in a tile list) at all.

It is believed that such an arrangement may be new and advantageous in its own right, as it could, for example, also be used to remove dynamic data sets (or avoid generating dynamic data sets) in arrangements where dynamic data is generated in advance as well.

Thus, according to a third aspect of the present invention, there is provided a method of processing graphics data, comprising:

attempting to identify, prior to rendering a scene for display, dynamic graphics data that will not in practice be required for rendering the scene.

According to a fourth aspect of the present invention, there is provided an apparatus for processing graphics data, comprising:

means for identifying prior to rendering a scene for display, dynamic graphics data that will not in practice be required for rendering the scene.

As will be appreciated by those skilled in the art, these aspects of the invention can and preferably do include any one or more or all of the preferred and optional features of the present invention described herein. Thus, for example, the identifying of whether the dynamic data will be required is preferably carried out by, in a tile-based system, attempting to identify any dynamic data that is not tied to a binned geometry (e.g., and preferably, primitive) for the scene at all. Similarly, if dynamic data that is not required is identified, that dynamic data is preferably omitted from the future processing for the scene.

In these aspects and embodiments of the invention, the dynamic data that is searched for can comprise any suitable and desired such data. In a preferred embodiment it comprises dynamic texture data (texture data), such as, and preferably, a dynamic texture map.

It would be possible to allow the present invention to operate in respect of all graphics processes. Alternatively, it would, e.g., be possible to indicate where the process of the present invention may be likely to be required, and only activate the possible operation in the manner of the present invention where the potential need for it is indicated. For example, and preferably, graphics entities, such as fragments, etc., to be processed, could be marked (e.g. flagged) as requiring dynamic data (e.g. dynamic textures) (or not) and the present invention only invoked for those entities (e.g. fragments) that are indicated as requiring dynamic data.

Thus, in a preferred embodiment, an indication of whether operation in the manner of the present invention could be required is provided, and the operation in the manner of the present invention is only activated in response to such indication.

The graphics processing system of or for use with the present invention can take any suitable form. As will be appreciated by those skilled in the art, it can and should comprise, as well as the particular components or features necessary to operate in accordance with the present invention, the other features and components necessary to allow it to process the graphics data for display. Thus it preferably comprises, e.g., one or more of a (programmable) vertex shader unit or units, a (programmable) fragment shader unit or units, rasterising unit(s), rendering unit(s) (including, e.g., texture mapping, fogging, and/or blending units, etc.), etc., as is known in the art.

The graphics processing system can be implemented as desired. In a preferred embodiment it is implemented as a single (silicon) platform.

In a preferred embodiment the present invention is applied to or implemented as a hardware graphics rendering pipeline.

The various functional elements, etc., of the present invention can be implemented as desired, for example, and preferably, by appropriate functional units, processing logic, circuitry, processors, microprocessor arrangements, etc.

The present invention can be used for any desired graphics processing system. It is particularly, but not exclusively, suited to 3D graphics processing systems, and, as will be appreciated by those skilled in the art, finds particular application for, and is preferably implemented in, tile-based rendering systems.

The present invention accordingly also extends to a graphics processor and/or a graphics processing system or platform, and preferably a 3D graphics processor and/or a graphics processing system or platform that includes the system or apparatus of the present invention, and/or that can be operated in accordance with one or more of the methods of the present invention. Subject to any hardware necessary to carry out the specific functions discussed above, such a graphics processor, etc., can otherwise include any one or more or all of the usual function/units etc., that graphics processors include.

As will be appreciated from the above, the present invention in general provides an arrangement whereby, if a graphics process requires data, the graphics processing system will first seek that data from memory, and then, if the data is not available in memory, generate that data for use.

Thus, according to a further aspect of the present invention, there is provided a method of processing graphics data of a scene for display in a graphics processing system, the method comprising:

when the processing of the scene data for display requires further data, attempting to fetch that further data from memory; and if the further data is not available in memory, generating the required further data and then using the generated further data for processing the scene data for display.

According to another aspect of the present invention, there is provided a system for processing graphics data of a scene for display in a graphics processing system, the system comprising:

means for, when the processing of the scene data for display requires further data, attempting to fetch that further data from memory; and means for, if the further data is not available in memory, generating the required further data and then using the generated further data for processing the scene data for display.

As will be appreciated by those skilled in the art, these aspects of the present invention can and preferably do include any one or more or all of the preferred and optional features of the invention described herein, as appropriate. Thus, for example the required further data is preferably texture data, vertex data, geometry data and/or tile list data.

Similarly, the present invention provides a method and system whereby the generation of data that may be needed for processing graphics data of a scene for display can be and is deferred until the time the data is needed for performing graphics processing.

Thus, according to a yet further aspect of the present invention, there is provided a method of processing graphics data for display in a graphics processing system, the method comprising:

deferring the generation of data to be used when processing a scene for display until such time as the data is required for a process for processing the scene for display.

According to a further aspect of the present invention, there is provided a system for processing graphics in which the generation of data to be used when processing a scene for display can be deferred until such time as the data is required for a process for processing the scene for display.

As will be appreciated by those skilled in the art, these aspects of the present invention can and preferably do include any one or more or all of the preferred and optional features of the invention described herein, as appropriate. Thus, for example the data to be generated is preferably texture data, vertex data, geometry data and/or tile list data, and/or is preferably to be used for and/or when processing other graphics data of a scene for display.

Similarly, the present invention provides a method and system whereby the generation of data that may be needed for processing graphics data of a scene for display can be performed on demand, at the time the data is needed for performing graphics processing.

Thus, according to a yet further aspect of the present invention, there is provided a method of processing graphics data for display in a graphics processing system, the method comprising:

generating data to be used when processing a scene for display on demand at the time the data is required for a process for processing the scene for display.

According to another aspect of the present invention, there is provided a graphics processing system, in which data to be used when processing a scene for display can be generated on demand at the time the data is required for a process for processing the scene for display.

As will be appreciated by those skilled in the art, these aspects of the present invention can and preferably do include any one or more or all of the preferred and optional features of the invention described herein, as appropriate. Thus, for example the data to be generated is preferably texture data, vertex data, geometry data and/or tile list data, and/or is preferably to be used for and/or when processing other graphics data of a scene for display.

As will be appreciated from the above, a particularly preferred arrangement and key feature of the present invention is that at least some of the dynamic graphics data needed for rendering a scene for display is not generated in advance of rendering a scene, but is instead generated on demand as the scene is rendered.

Thus, according to a further aspect of the present invention, there is provided a method of processing graphics data for display in a graphics processing system, in which the processing of the graphics data for display may require the use of dynamic graphics data, the method comprising:

not generating dynamic graphics data to be used when processing a scene for display in advance of processing the scene for display; and generating dynamic graphics data to be used when processing the scene for display on demand as it is determined that the dynamics graphics data is required for processing the scene for display.

According to another aspect of the present invention, there is provided a graphics processing system, in which the processing of graphics data for display may require the use of dynamic graphics data, is the system comprising:

means for, instead of generating dynamic graphics data to be used when processing a scene for display in advance of processing the scene for display, generating dynamic graphics data to be used when processing the scene for display on demand as it is determined that the dynamics graphics data is required for processing the scene for display.

As will be appreciated by those skilled in the art, these aspects of the present invention can and preferably do include any one or all of the preferred and optional features of the invention described herein, as appropriate. Thus, the dynamic graphics data is preferably dynamic texture data, dynamic vertex data, dynamic geometry data and/or tile list data.

As discussed above, a particularly preferred arrangement of the present invention involves the generation of dynamic graphics data on-demand as necessary.

Thus, according to a further aspect of the present invention, there is provided a method of processing data in a graphics processing system, the method comprising:

the graphics processing system:

receiving data for processing;

recognising that dynamic graphics data is needed for processing the received data;

determining whether the dynamic graphics data that is needed is already available in memory; and if the dynamic graphics data is not available in memory, generating the required dynamic graphics data and then using the generated data for processing the data to be processed.

According to another aspect of the present invention, there is provided a graphics processing system, the system comprising:

means for receiving data for processing;

means for recognising that dynamic graphics data is needed for processing the received data;

means for determining whether the dynamic graphics data that is needed is already available in memory; and means for, if the dynamic graphics data is not available in memory, generating the required dynamic graphics data and then using the generated data for processing the data to be processed.

As will be appreciated by those skilled in the art, these aspects of the present invention can and preferably do include any one or more or all of the preferred and optional features of the invention described herein, as appropriate. Thus, for example the dynamic graphics data to be generated is preferably texture data, vertex data, geometry data and/or tile list data.

As will be appreciated by those skilled in the art, all of the aspects and embodiments of the present invention described herein can and preferably do include any one or more or all of the preferred and optional features of the invention described herein, as appropriate.

The methods in accordance with the present invention may be implemented at least partially using software e.g. computer programs. It will thus be seen that when viewed from further aspects the present invention provides computer software specifically adapted to carry out a method or the methods herein described when installed on data processing means, a computer program element comprising computer software code portions for performing a method or the methods herein described when the program element is run on data processing means, and a computer program comprising code means adapted to perform all the steps of a method or of the methods described herein when the method is run on a data processing system.

The invention also extends to a computer software carrier and/or a computer program product or medium comprising such software which when used to operate a microprocessor system and/or a graphics processing system comprising data processing means causes in conjunction with said data processing means said system to carry out the steps of a method or of the methods of the present invention. Such a computer software carrier or product could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of a method or of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred embodiments of the present invention will now be described by way of example only and with reference to the accompanying drawings, in which:

FIG. 1 shows schematically an arrangement of a graphics processing system 1 that can be operated in accordance with the present invention.

The present embodiment of the present invention will be described in relation to a tile-based rendering system and to the generation of dynamic textures in the manner of the present invention. However, as discussed above, other arrangements are, of course, possible.

Figure 1:
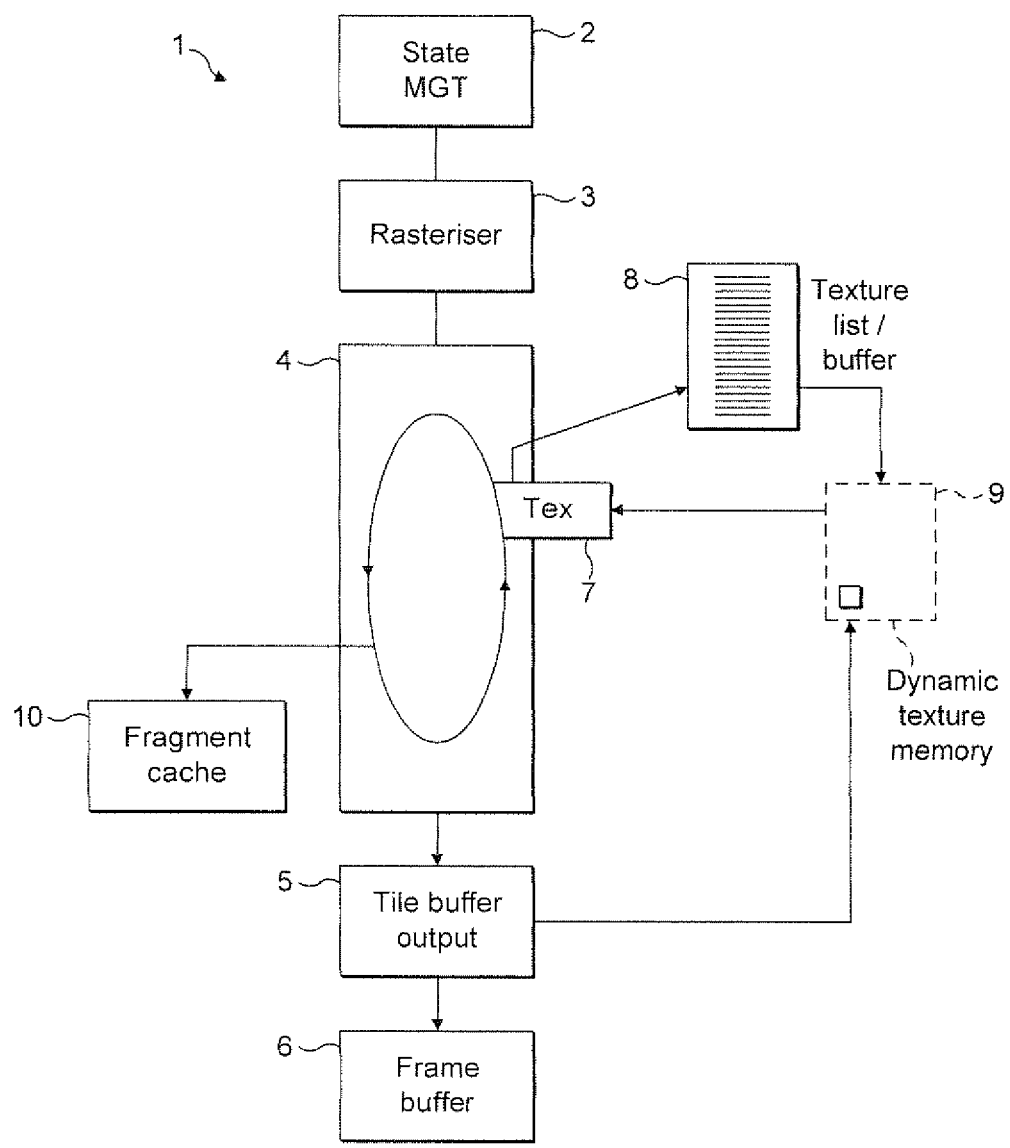
FIG. 1 shows schematically a graphics processing system that may be operated in accordance with the present invention.

As shown in FIG. 1, the graphics processing system 1 includes a state management system 2, a rasterising stage 3, and a rendering stage 4 in the form of a rendering pipeline.

The state management system 2 stores and controls state data and the state of the graphics processing units to control the graphics processing operation, as is known in the art.

The rasteriser 3 takes as its input primitives to be displayed, and rasterises those primitives to fragment positions (fragments) to be rendered, as is known in the art.

The rendering pipeline 4 takes fragments from the rasteriser 3 and renders those fragments for display. As is known in the art, the rendering pipeline 4 will include a number of different processing units, such as fragment shaders, blenders, texture mappers, etc.

The output from the rendering pipeline 4 (the rendered fragments) is output to tile buffers 5 (since the present embodiment is a tile-based system). The tile buffers' outputs are then finally output to a frame buffer 6 for display.

FIG. 1 also shows schematically particular features of the graphics processing system 1 that are provided in order for it to operate in the manner of the present embodiment.

In particular, as shown in FIG. 1, a texture mapping stage 7 of the rendering pipeline 4 is configured to be able to access a texture list buffer 8 to determine a texture needed for texturing a fragment that it receives for rendering. The textures to be used in the present embodiment can, as is known in the art, comprise both "static" textures and "dynamic" textures. The texture list buffer 8 will indicate the texture that is required, and then, as is known in the art, the texture mapping system 7 will attempt to fetch the relevant texture and/or texels that are required from memory and used the fetched data to process the fragment in question.

As shown in FIG. 1, in the present embodiment, dynamic textures are handled by storing those textures in a dynamic texture memory 9. Thus, when a fragment requires a dynamic texture, the texture list buffer 8 will indicate to the texture unit 7 in the rendering pipeline 4 that a texture from the dynamic texture memory 9 is to be fetched and used for processing the fragment.

FIG. 1 also shows a fragment cache 10. This cache is used, as will be discussed further below, to store data relating to fragments whose processing has needed to be interrupted (stalled) while a dynamic texture is generated in the manner of the present invention.

As shown in FIG. 1, the tile buffers 5 can also be configured to output data to the dynamic texture memory 9. As will be discussed further below, this arrangement is used when generating dynamic textures in the manner of the present embodiment, to allow the generated textures to be stored in the dynamic texture memory 9 so that they can then be retrieved therefrom for use when rendering fragments.

It will be appreciated that each of the stages, elements, and units, etc., of the graphics processor as shown in FIG. 1 may be implemented as desired and will accordingly comprise, e.g., appropriate circuitry, and/or processing logic, programmable logic, etc., for performing the necessary operation and functions, and will form the appropriate control and processing circuitry, etc., of the present invention.

The operation of the graphics processing system of FIG. 1 in accordance with an embodiment of the present invention will now be described with reference to FIG. 2.

Figure 2:
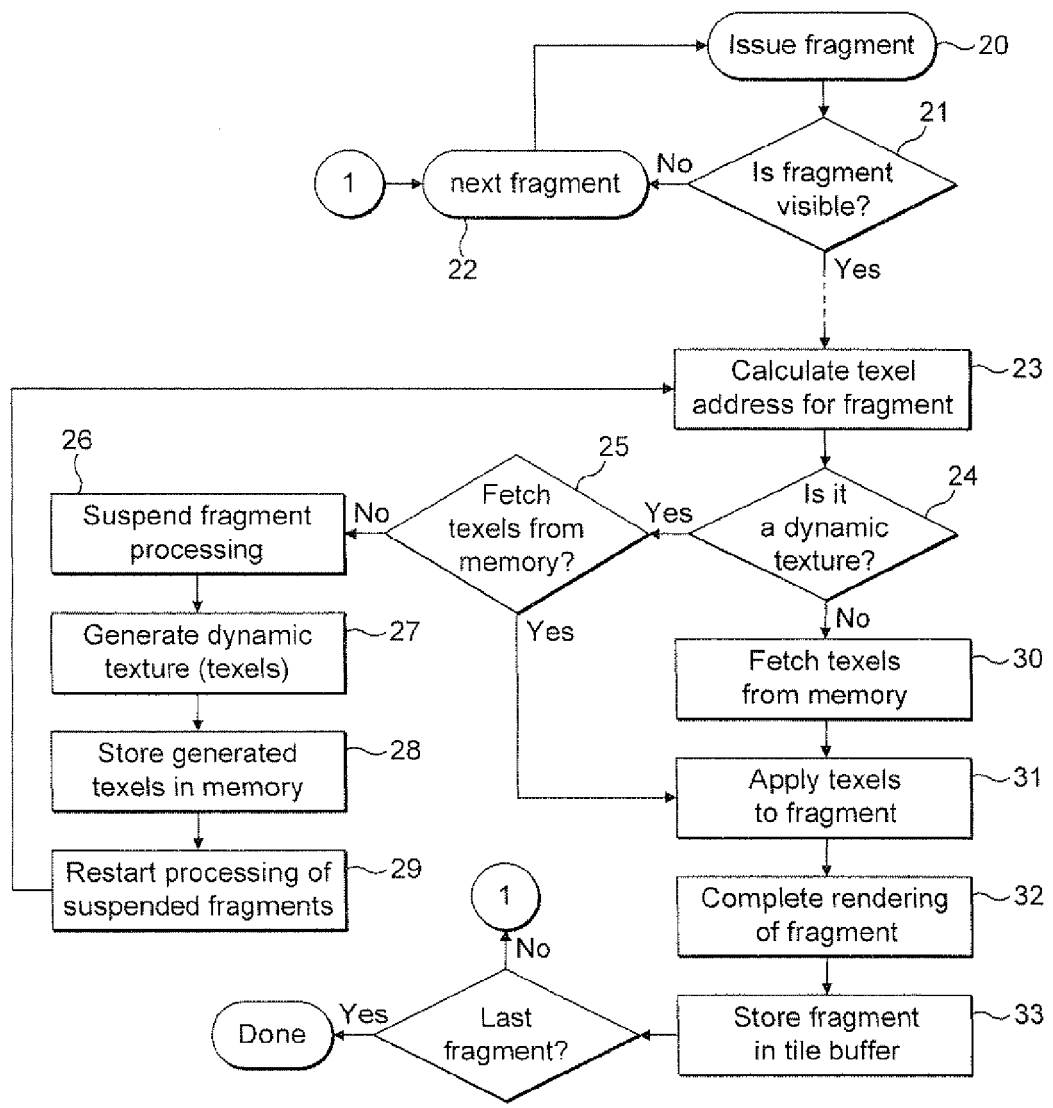
FIG. 2 shows schematically the operation of the graphics processing system of FIG. 1 in an embodiment of the present invention.
Figure 3:
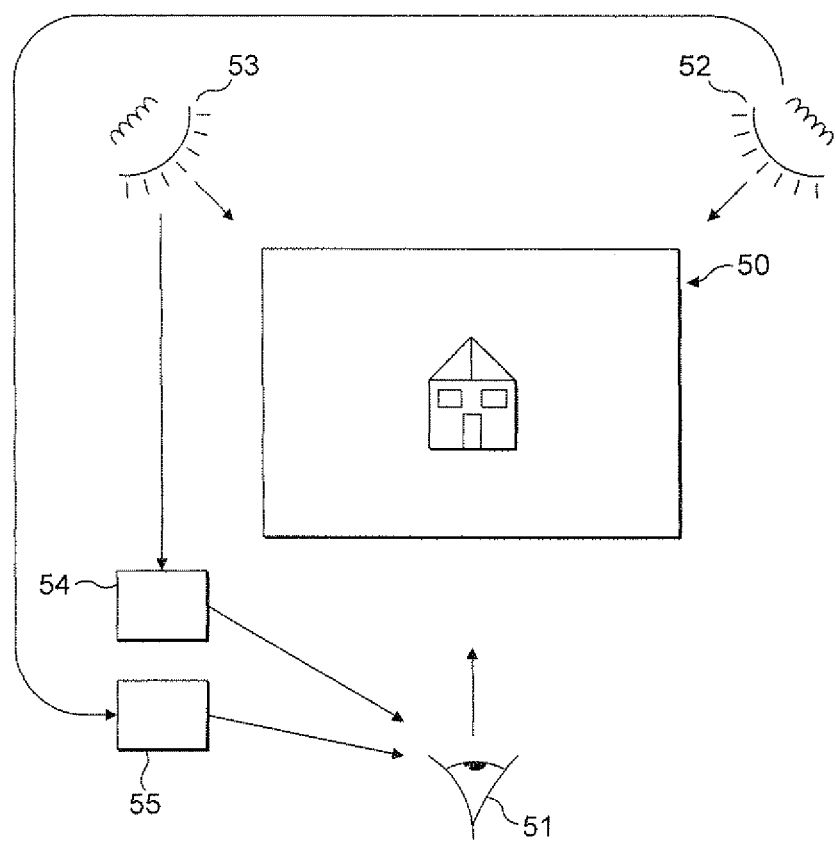
FIG. 3 shows schematically a prior art technique for generating dynamic texture data.

FIG. 2 shows the steps in the process of the present embodiment starting once the fragments for a tile have been generated (issued) by the rasteriser 3 (Step 20).

The first stage in the process is to carry out an initial "visibility" test on each fragment (to see if any fragments can be eliminated from further processing) (Step 21). In the present embodiment this test is an early depth or Z-test. However, other "visibility" tests could be used instead or as well. For example, it would be possible also or instead to do a test as to whether a fragment actually falls within the visible frame, and/or to use other hidden surface removal techniques.

If a fragment is found not to be visible by the visibility test being used, then it is not passed to the rendering pipeline (i.e. it is discarded from further processing) (Step 22). This means that the fragment will not, inter alia, trigger the generation of any dynamic texture, and so further reduces the possibility of redundantly generating dynamic textures. (Indeed, it is in general preferred to try to remove as much data, etc., from the rendering process at an early stage, as possible, as that will in general reduce the amount of potentially redundant dynamic texture generation that will be performed.)

If the fragment is found to be "visible", it is passed to the rendering pipeline 4 for rendering.

It is then assumed in FIG. 2 that the fragment reaches the texturing stage 7, at which point the texel address to be used for the fragment will be calculated (Step 23). This is done in the present embodiment by checking the texture list buffer 8.

In the present embodiment, it is assumed that textures include an additional tag indicating whether they are static or dynamic textures. This is checked at step 24. (However, it is also possible to operate the invention without the need to tag whether textures are static or dynamic. The system could still simply seek to retrieve the necessary texels from memory, and if it does not find those texels in memory, then proceed to generate them in the manner of the present embodiment.)

If it is found that the texture is not a dynamic texture, then the system can proceed to fetch the texel(s) and complete the rendering of the fragment in the normal manner (since in this case it can be assumed that the texels will already exist in memory and be available for use) (Steps 30 to 33).

If it is determined that the required texels relate to a dynamic texture, then the system first tries to fetch those texels from the dynamic texture memory 9 (Step 25).

If the texels exist in the dynamic texture memory 9, then the texels can be retrieved straightaway and the dynamic texture applied to the fragment in question in the normal manner (i.e. as would be the case with static textures) (Step 31).

The fragment can then be rendered as normal and output to the tile buffer 5 (Steps 32 and 33).

On the other hand, if it is found that the texel required for applying the dynamic texture to the fragment in question is not available in the dynamic texture memory 9 (i.e., in effect, a dynamic texture "miss" occurs), then the relevant texels must be generated.

The first stage in this process is to suspend the rendering of the fragment that requires the dynamic texel in question (since this processing cannot be completed until the dynamic texel has been generated) (Step 28). This is done by storing the relevant fragment data, rendering state data, etc., relating to the fragment in the fragment cache 10, so that that current data can be retrieved and the fragment is processing recommenced at the point it was suspended, once the new dynamic texel or texels (dynamic texture data) has been generated).

(This fragment data is stored in a fragment cache 10 that is outside of the rendering pipeline 4 while the dynamic texture data is generated, because, as will be discussed further below, the rendering pipeline 4 will be used to generate the dynamic texture data, and so it is preferred not simply to loop the suspended fragment back in the rendering pipeline 4 (as might otherwise be done in the case of a "normal" texture cache miss).)

In the present embodiment, as well as suspending the fragment that has triggered the dynamic texture generation process, the system also operates to try to identify other graphics entities and processes, such as other fragments and primitives, that may also be affected by the need to generate the dynamic texture (texels), and suspends or removes the processing of those graphics entities, etc. (by again storing the relevant information in the fragment cache 10) until the dynamic texture to be generated is ready.

For example, the system tries to identify any other fragments that will need the dynamic texture that is to be generated and to suspend those fragments until the dynamic texture has been generated. This is based on, for example, the fragments' positions and their associated rendering states.

Similarly, the system preferably also operates to identify any subsequent primitives that may be affected by the suspended fragments (e.g. because they are to be blended with the suspended fragments) and again to suspend or stop the rendering of those primitives until the dynamic texture to be generated is ready. Again, this can be done by using, for example, the primitives' positions and state information. For example, any primitives that fall within the region of the fragment that has triggered the need to generate the dynamic texture data could be suspended from processing until the dynamic texture has been generated. Again, any necessary data to allow the suspended primitives to be processed appropriately at the later time is stored in an appropriate manner.

It will be appreciated that in these arrangements, when fragments are suspended in the manner of the present embodiment because a dynamic texture needs to be generated, then it could be that a large number of other fragments or primitives, etc., will also be suspended at that time.

In view of this, and so as to avoid the entire operation of the rendering pipeline 4 needing to be suspended in this event, the rendering pipeline 4 in the present embodiment has the ability to hold and switch between multiple "rendering contexts". In other words, upon the suspension of rendering of a set of fragments that require or that could be affected by a dynamic texture that is to be generated, the rendering pipeline 4 can switch to rendering a different set of fragments (another "rendering context") while the first set of fragments (the first "rendering context") waits for the dynamic texture generation process to complete. In these arrangements, the different "rendering contexts" would typically be given sections of the frame buffer.

The switch between different "rendering contexts" can be carried out, for example, by appropriate configuration of the state of the rendering pipeline 4 and/or of rendering units within the pipeline.

Once the relevant fragment, graphics entities, etc., have been suspended, the process then proceeds to generate the required dynamic texture (texels) (Step 27) and to store them in the dynamic texture memory 9 (Step 28).

In the present embodiment, the rendering pipeline 4 is used to generate the relevant dynamic texture (texels), by rendering that texture in the normal manner as would be done when using a rendering pipeline to generate a dynamic texture. Thus the relevant dynamic texture geometry and/or texture objects, etc., are passed to the rendering pipeline 4, which then proceeds to render those objects to provide dynamic texture output (texels) to the tile buffers 5. The tile buffers 5 are then configured to store the generated dynamic texels in the dynamic texture memory 9, so that they can then be retrieved therefrom when the fragments that require the dynamic texture are rendered (when the processing of those fragments is recommenced).

In other words, the rendering pipeline 4 renders the dynamic texture and stores it in the dynamic texture memory 9, so that it can then be used as a texture source for the rendering pass of the fragments in question (as would normally be the case if the dynamic texture was already stored in the dynamic texture memory 9, or a static texture was being used).

The appropriate configuration of the rendering pipeline 4 to generate the required dynamic texture (texels) is achieved by setting the state of the rendering pipeline (and/or of rendering units of the rendering pipeline) appropriately.

Other arrangements would be possible. For example, instead of using the rendering pipeline 4 itself to generate the dynamic texture in the manner of the present embodiment, dedicated processing units could be provided for that purpose.

The dynamic texture data generation process can also involve other stages of data generation if desired, such as, for example, vertex shading in order to complete the generation of geometry data necessary for generating the dynamic texture and/or a tiling (binning) process to sort the geometry that is to be used for generating the dynamic texture by its position or location in the scene. (The latter may be advantageous, because by "tiling" the geometry to be used to generate the dynamic texture, that can then reduce the amount of geometry that is actually processed when the dynamic texture is generated in the manner of the present embodiment.)

In general, the actual processes carried out to generate the dynamic texture in the manner of the present embodiment will depend upon what data structures, etc., are already available to the rendering pipeline at the time the data is to be generated. For example, if, in fact, the vertex shading for the dynamic texture objects and/or their tiling or binning have been already performed, then there is no need to repeat those processes at the stage the actual dynamic texture texels are to be generated, and the rendering pipeline 4 can instead simply render the relevant texels for the dynamic texture. On the other hand, if geometry data (vertex shading) still needs to be generated and/or a tiling (binning) data structure is still required, then those processes can be performed at the time the dynamic texture (texels) are to be generated, if desired.

Indeed, it may be preferable even in this embodiment of the present invention (and in the present invention in general) still to carry out the generation of some data required for generating a dynamic texture, such as the geometry data (the initial vertex shading) and/or the generation of a tiling (binning) data structure for the dynamic texture, in advance of rasterising and rendering the fragments of the scene for display, since those processes may potentially be large, such that carrying them out at the time the dynamic texture is to be generated during fragment rendering could undesirably force a very long fragment processing suspension. Thus in cases where, for example, it is very likely for a given dynamic texture to be accessed, it may be preferable to carry out these processes in advance, so that they can be done, e.g., in parallel with previous-frame rendering, and will not then suspend for a relatively long time the fragment rendering for the scene in question.

In the present embodiment, when it is determined that it is necessary to generate dynamic texture (texels) for use when rendering a fragment, then the system also operates to identify a region of the dynamic texture in question that should be generated.

This is because it may, for example, be desirable to calculate more than just the texels that are needed at the time the data generation is carried out, for example, if there is a relatively high overhead for the dynamic texture data generation process. Thus, in the present embodiment, it is possible to selectively configure what region of the dynamic texture is generated at any given dynamic texture generation event. This could be based, for example, on information from the state management system 2 indicating which primitives, fragments, tiles, regions of the scene, etc., may require the dynamic texture in question.

For example, the dynamic texture (texels) for the tile in question (i.e. the tile to which the fragment that triggered the dynamic texture generation relates) could be generated and stored. This would then potentially avoid having to generate that dynamic texture again for the tile in question.

Once the relevant dynamic texture data (texels) has been generated and stored in the dynamic texture memory 9, the processing of the suspended fragments, etc., can be recommenced, as they will then be able to use the dynamic texture from the dynamic texture memory 9 in the normal manner (Step 29).

In the present embodiment, the rendering of the suspended fragments, etc., is recommenced at the point in which their processing was suspended, using the fragment information, etc., stored in the fragment cache 10. Thus, the fragments are "returned" to the texel address calculation stage (Step 23).

The suspended fragments then complete their rendering in the normal manner (since this time the required dynamic texture data will be available in the dynamic texture memory 9), and are stored in the tile buffer 5 for output to the frame buffer 6 as appropriate (Steps 24, 25, 31, 32 and 33).

Other arrangements could, of course, be used. For example, it would be possible to rollback the processing of the suspended fragments, etc., to an earlier stage in their rendering, or, indeed, simply to cancel the fragments completely and reissue them at the beginning of the rendering pipeline 4, if desired. In each case, the fragment cache 10 would be used to store whatever data is required about how to reissue the fragments, etc., that have been suspended or cancelled, so that the rendering process for those fragments, etc., can be restarted in the appropriate manner, and rendering consistency can be preserved.

It can be seen that in the above embodiment, rather than generating a dynamic texture in advance of rendering fragments, the dynamic texture is instead generated (rendered) on demand as the fragments are generated, by pausing the rendering of those fragments, using the rendering pipeline to generate the dynamic texture, and then recommencing the rendering of the paused fragment.

This arrangement has a number of potential advantages.

For example, if a dynamic texture is not in fact accessed at all by a fragment that is rendered, then the generation of that dynamic texture can potentially be omitted entirely. Similarly, if fragments only access a section of a given dynamic texture and not the whole texture map, then again in the present embodiment only those regions of the dynamic texture that are actually needed may actually be generated, such that the potential redundant generation of dynamic texture data is reduced.

The present invention can similarly reduce the memory footprint required for handling of dynamic textures. For example, in the present embodiment memory will only be required for the generation and storing of parts of the dynamic texture that it is found may be required for rendering, rather than for storing the entire dynamic texture regardless. Thus the present embodiment can avoid the need to allocate or reserve memory for regions of a dynamic texture that may not actually be required and/or that have not actually been generated.

It would also be possible in the present embodiment to discard previously generated dynamic textures and dynamic texture data (and any intermediate data structures generated for that purpose) to recover memory, even during actual rendering (since that data can always be regenerated in the manner of the present embodiment if it is required again). This may mean that a region of the dynamic texture needs to be generated in the manner of the present embodiment more than once, but even so the ability to discard and/or recover memory used for dynamic textures permits the use of dynamic textures with very small physical memory footprints, and also the ability to tradeoff and optimise between performance and memory footprint.

Although the present embodiment has been described above with reference to the generation of dynamic textures, the principles of the present invention and of the present embodiment can also be applied to other forms of graphics data such as, and in particular, other forms of dynamic graphics data.

Thus the invention can equally be applied, for example, to the generation of tile lists in tile-based rendering systems, and to vertex texturing and "render to vertex buffer" (RTVB), such as the generation of dynamic geometries and vertices. In these cases, the process that triggers the generation of the "dynamic" data would not be a rendering process (e.g. a fragment shader) but would instead be, e.g., a vertex shading or geometry shading process (a vertex shader or a geometry shader).

Figure 4:
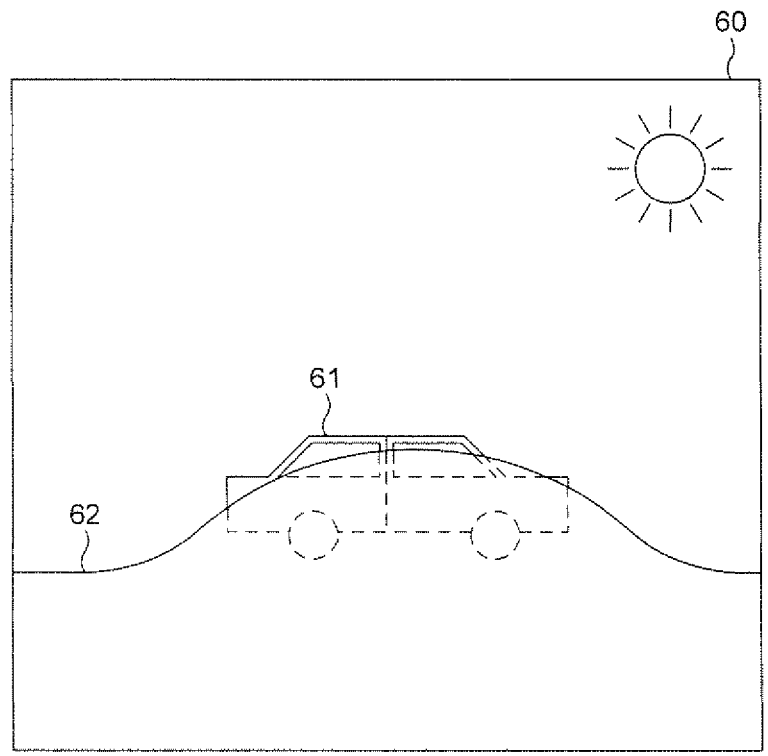
FIG. 4 shows schematically a scene to which the techniques of the present invention can usefully be applied.

FIG. 4 shows an exemplary situation in which it may be desirable to generate vertex data and tile list data on demand in the manner of the present invention.

FIG. 4 shows a scene 60 to be rendered for display which includes a complex object 61 that may in part or completely be occluded by a foreground feature 62. The complex object 61 is made up, in this example, of many individual primitives.

It would be possible simply to render the scene 60 in the normal fashion, i.e. to rendering each primitive making up the complex object 61 individually, e.g. to determine whether or not each primitive is occluded by the foreground object 62. However, this could require significant processing given the number of individual primitives that make up the complex object 61.

The Applicants have accordingly recognised that it may be desirable to, instead of processing the complex object 61 in the form of its individual primitives, initially attempt to process that object as a whole, to see if it can be determined, for example, whether the object in its entirety will be occluded.

In order to do this, the graphics processing system is in this embodiment configured to generate an alternative, coarser or more abstract description of the complex object 61 than the form of its individual primitives. In the present embodiment, this more abstract or coarser representation of the object 61 is a bounding box 63 for the object 61, which can then be used as a single primitive representing the complex object 61 for processing.

Figure 5:
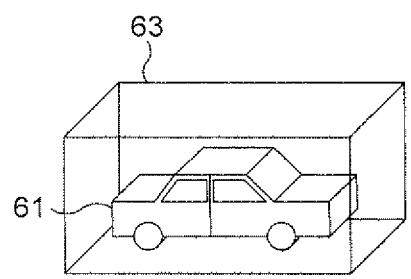
FIG. 5 shows schematically a modified object descriptor for use when processing the scene of FIG. 4.

FIG. 5 illustrates this, namely the provision of a meta-primitive 63 in the form of a bounding box that can be used to represent (the position of) the object 61 is in the scene 60.

In the present embodiment, the bounding box or meta-primitive 63 representing the object 61 can be generated in one of two ways. First of all, the vertex data defined for the object 61 can be assessed, the bounding box or meta-primitive 63 representing the object 61 created from that data, and then that meta-primitive 63 transformed to the screen space for rendering. Alternatively, the vertex data defined for the object 61 could first be transformed to screen space, and then a bounding box or meta-primitive 63 defined for representing the object 61 in screen-space.

Once the bounding box, meta-primitive representation 63 of the complex object 61 has been generated, the scene 60 can be sent through the rasterising and rendering pipeline (such as a pipeline of the form shown in FIG. 1) in the normal fashion, but with the meta-primitive 63 representing the complex object 61, rather than sending the individual primitives making up the object 61 to the pipeline for processing.

The bounding box, meta-primitive 63 will be treated by the processing pipeline like any other primitive. Thus, the meta-primitive 63 will, for example, in the rendering pass be binned to appropriate tiles, can be culled if it is not in a tile at all, and can and will undergo the various forms of occlusion testing and depth testing that are provided in the rendering pipeline.

The results of any occlusion testing on the meta-primitive 63 representing the complex object 61 can be used to determine, for example, whether the object 61 is completely occluded by the foreground object 62 in the scene. If so, the meta-primitive 63 representing the object 61 can be rejected (culled) from the rendering process (and the individual primitives making up the object 61 will never be processed).

However, if in its pass through the pipeline it is determined that the meta-primitive 63 is not completely occluded by the foreground object 62, then it is necessary to process the object 61 in its true form, so that it can be properly rendered into the scene 60.

In this case the graphics processing system must be triggered to now process the object 61 in its "true" individual primitive form, so that it can be properly rendered into the scene 60. In order to achieve this, the meta-primitive 63 representing the object 61 has associated with it suitable information, data or tags, etc., that will trigger the processing of the true primitives representing the object 61 if the meta-primitive 63 is not rejected in its pass through the graphics processing system.

However, when this operation is triggered, only the meta-primitive 63 and not the individual primitives making up the complex object 61 will in this embodiment have been sorted (binned) into the tile-lists for the scene.

Thus, when the graphics processing system is to render the complex object 61 in its individual primitive form, it will attempt to read the individual primitives from the tile lists, but find that that information is not present in the tile lists. That will then trigger operation to generate and perform the appropriate binning of the individual primitives making up the object 61 into the tile lists in an on-demand fashion (i.e. in the manner of the present invention).

A similar situation may arise in relation to the vertex data needed for processing the individual primitives making up the complex object 61. Depending upon how the meta-primitive 63 was generated, it may be that there is no transformed vertex data for the vertices of the individual primitives representing the complex object 61 already stored in memory when those primitives come to be processed. In that case again, when the processing pipeline needs that vertex data, it will firstly attempt to get it from memory, find that it is not there, and can then trigger the generation of that data in an on-demand fashion in the manner of the present invention.

Once this data is generated and available, then the graphics processing system can process the "true" individual primitives making up the complex object 61 in the normal fashion, and thereby determine which of those primitives will in fact be seen and which are occluded, as is known in the art.

In a preferred embodiment, the meta-primitive 63 is tagged so that it undergoes a Z-only pass through the renderer (since attempting to render the meta-primitive 63 fully would be inappropriate, since it is not the true object that is to be drawn in the scene 60).

It would, of course, be possible to have other variations and modifications to the present embodiments and invention.

For example, as well as the initial fragment visibility test discussed above, in a preferred embodiment, a test is carried out during the tiling (binning) stage to try to determine whether or not dynamic textures will be used. To do this the binning stage may contain logic to try to detect the use/non-use of dynamic textures (to search for unused dynamic textures).

This is preferably done by trying to identify dynamic textures that are not tied to any binned primitives at all (which would suggest that the dynamic textures are not "Present" in the view frustum at all). Any dynamic textures that are found not to be tied to any binned primitive at all can be discarded at that stage, since they should accordingly never be needed for the scene in question.

This would further help to avoid the unnecessary generation of dynamic textures that will in fact never be used for a scene.

It can be seen from the above that the present invention, in its preferred embodiments at least, provides improved techniques and systems for handling, inter alia, dynamic graphics data. In particular, it provides arrangements for handling of dynamic graphics data, etc., that can reduce the memory requirements for such data and/or facilitate tradeoffs and optimisations as between memory requirements and rendering performance, etc.

The present invention also facilitates more predictable and fixed-sized memory usage in graphics systems, particularly for inherently unpredictable data requirements, such as dynamic graphics data. It also means that, for example, the memory area to be used for such data can be set to have a predefined size (memory footprint), without significant performance loss.

The present invention is accordingly particularly advantageous in situations where memory resources may be restricted or limited, such as in low power and/or portable devices and products, such as mobile phones, PDAs, etc., and in embedded graphics systems, etc.

This is achieved, in preferred embodiments of the present invention at least, by, rather than generating any required dynamic data in advance prior to generating the scene for display, being able to generate, and generating, that data in an "on demand" fashion as it is found to be needed when generating the scene for display. In particular, the system and method of the present invention, in its preferred embodiments at least, checks to see whether required data is available in memory at the time it is needed to be used, and if it is not present in memory at that time, then generates that data there and then for use.

The invention claimed is:

1. A method of processing data in a graphics processing system, the method comprising:
    the graphics processing system:
    when the processing of data to be processed by the graphics processing system requires further data, attempting to fetch that further data from memory;
    in response to the attempted fetch not returning the further data from the memory, then generating the required data and using the generated data for processing the data to be processed; and
    in response to the attempted fetch detecting that the further data is available in the memory, then fetching that further data from the memory and using the fetched further data for processing the data to be processed without generating that further data.

2. The method of claim 1, wherein the data that is sought in memory, and, if necessary, generated, comprises dynamic graphics data.

3. The method of claim 1, wherein the data that is sought in memory, and, if necessary, generated, comprises texture data, vertex data, geometry data and/or tile list data.

4. The method of claim 1, comprising storing the generated data in memory so that it can be available for use for later graphics processes.

5. The method of claim 1, comprising generating more data than the data that is required for the process in question when the required data is generated.

6. The method of claim 1, wherein the data generation process includes a step of identifying a sub-set of all the available data and/or information that might be needed for that process, and the data generation process then uses only that sub-set of data.

7. The method of claim 1, comprising:
    suspending and/or stopping one or more graphics processes and/or the processing of one or more graphics entities while the required data is generated.

8. The method of claim 1, comprising:
    searching for, prior to rendering a scene for display, dynamic graphics data sets to be generated for the scene that will not be used when processing the scene for display; and
    discarding any dynamic graphics data sets from further processing in relation to the scene that are found not to be used for the scene.

9. A method of processing graphics data in a tiling-based graphics processing system in which dynamic texture maps for use when rendering a scene for display are generated on a scene-by-scene basis, the method, comprising:
    sorting, by one or more data processors, geometry for a scene to be rendered for display into tile lists;
    identifying by the one or more data processors, prior to rendering the scene for display, dynamic texture maps to be generated for the scene that are not tied to any geometry that is included in a tile list for the scene; and
    discarding, by the one or more data processors, any dynamic texture maps from further processing in relation to the scene that are found to not be tied to any geometry that is included in the tile list for the scene.

10. A graphics processing system, the system comprising:
    processing circuitry configured to process data;
    memory configured to store data that is needed for processing data to be processed by the processing circuitry; and
    control circuitry configured:
        when the processing of data to be processed by the graphics processing system requires further data, to attempt to fetch that further data from the memory,
        in response to the attempted fetch not returning the further data from the memory to then generate the required data and use the generated data for processing the data to be processed, and
        in response to the attempted fetch detecting that the further data is available in the memory, to then fetch that further data from the memory and use the fetched further data for processing the data to be processed without having to generate that further data.

11. The system of claim 10, wherein the data that is sought in memory, and, if necessary, generated, comprises dynamic graphics data.

12. The system of claim 10, wherein the data that is sought in memory, and, if necessary, generated, comprises texture data, vertex data, geometry data and/or tile list data.

13. The system of claim 10, comprising control circuitry configured to store the generated data in memory so that it can be available for later use.

14. The system of claim 10, wherein the control circuitry causes the processing circuitry when it is to generate the required data to generate more data than the data that is required for the process in question when the required data is generated.

15. The system of claim 10, wherein the processing circuitry when configured to generate the required data is configured to identify a sub-set of all the available data that might be needed for that process, and to use only that sub-set of data for the data generation process.

16. The system of claim 10, comprising:
control circuitry configured to suspend the processing of at least one graphics entity while the required data is generated.

17. The system of claim 10, comprising:
control circuitry configured to search for, prior to rendering a scene for display, dynamic graphics data sets to be generated for the scene that will not be used when processing the scene for display; and
control circuitry configured to discard any dynamic graphics data sets from further processing in relation to the scene that are found not to be used for the scene.

18. An apparatus for processing graphics data in a graphics processing system in which dynamic texture maps for use when rendering a scene for display are generated on a scene-by-scene basis, the apparatus comprising:
control circuitry configured to sort geometry for a scene to be rendered for display into the lists;
control circuitry configured to identify, prior to rendering a scene for display, dynamic texture maps to be generated for the scene that are not tied to any geometry that is included in a tile list for the scene; and
control circuitry configured to discard any dynamic texture maps from further processing in relation to the scene that are found to not be tied to any geometry that is included in a tile list for the scene.

19. A 3D graphics processor comprising:
processing circuitry configured to process data;
memory configured to store data that is needed for processing data to be processed by the processing circuitry; and
control circuitry configured:
when the processing of data to be processed by the graphics processing system requires further data, to attempt to fetch that further data from the memory,
in response to the attempted fetch not returning the further data from the memory to then generate the required data and to then use the generated data for processing the data to be processed, and
in response to the attempted fetch detecting that the further data is available in the memory, to then fetch that further data from the memory and use the fetched further data for processing the data to be processed without having to generate that further data.

20. A non-transitory computer program product comprising computer software code stored in a computer-readable medium for performing, when the software code is run on a data processor of a graphics processing system, a method of processing data comprising:
when the processing of data to be processed by the graphics processing system requires further data, attempting to fetch that further data from memory;
in response to the attempted fetch not returning the further data from the memory, then generating the required data and then using the generated data for processing the data to be processed; and
in response to the attempted fetch detecting that the further data is available in the memory, then fetching that further data from the memory and using the fetched further data for processing the data to be processed without generating that further data.

* * * * *